(12) United States Patent
Kim et al.

(10) Patent No.: US 11,077,848 B2
(45) Date of Patent: Aug. 3, 2021

(54) VEHICLE AND CONTROL METHOD OF VEHICLE

(71) Applicants: HYUNDAI MOTOR COMPANY, Seoul (KR); KIA MOTORS CORPORATION, Seoul (KR)

(72) Inventors: Kye Yoon Kim, Gunpo-si (KR); Jimin Han, Anyang-si (KR); Jia Lee, Uiwang-si (KR); Seok-young Youn, Seoul (KR); Seunghyun Woo, Seoul (KR)

(73) Assignees: Hyundai Motor Company, Seoul (KR); Kia Motor Corporation, Seoul (KR)

( * ) Notice: Subject to any disclaimer, the term of this patent is extended or adjusted under 35 U.S.C. 154(b) by 418 days.

(21) Appl. No.: 16/213,777

(22) Filed: Dec. 7, 2018

(65) Prior Publication Data

US 2020/0101800 A1 Apr. 2, 2020

(30) Foreign Application Priority Data

Sep. 28, 2018 (KR) .......................... 10-2018-0116412

(51) Int. Cl.
*B60W 30/095* (2012.01)
*B60C 17/06* (2006.01)
*B60C 29/06* (2006.01)
*B60W 30/08* (2012.01)
*B60R 21/01* (2006.01)

(52) U.S. Cl.
CPC .......... *B60W 30/095* (2013.01); *B60C 17/065* (2013.01); *B60C 29/062* (2013.01); *B60R 2021/01204* (2013.01); *B60W 2030/082* (2013.01)

(58) Field of Classification Search
CPC .......... B60W 30/095; B60W 2030/082; B60R 21/01; B60R 21/01013; B60R 2021/01204; B60R 2021/01252; B60C 17/065; B60C 29/062; B60C 17/00; B60C 23/00
USPC .................................................... 701/45, 301
See application file for complete search history.

(56) References Cited

U.S. PATENT DOCUMENTS

| 5,729,195 A | * | 3/1998 | Kang | ...................... B60R 21/00 340/436 |
| 6,334,490 B1 | * | 1/2002 | Dille | ....................... A62C 3/07 169/14 |
| 2016/0059855 A1 | * | 3/2016 | Rebhan | ............... B60W 30/095 701/41 |

FOREIGN PATENT DOCUMENTS

KR  10-2000-0005163 A  1/2000

* cited by examiner

*Primary Examiner* — Nadeem Odeh
(74) *Attorney, Agent, or Firm* — Morgan, Lewis & Bockius LLP

(57) ABSTRACT

A vehicle includes: a sensor for measuring a relative position and a relative speed between an obstacle and the vehicle; an injector for injecting a deforming material which is solidified during injection to absorb an impact and enhance coupling strength at a portion to which the deforming material is attached; and a controller configured to determine a collision probability with the obstacle based on the measured relative position and the measured relative speed, to determine a predicted collision position when the collision probability reaches a reference collision probability, to determine an injection direction of the injector based on the predicted collision position, and to control the injector to inject the deforming material in the determined injection direction.

23 Claims, 10 Drawing Sheets

12 : 12a, 12c
14 : 14a, 14c
18 : 18L, 18R
111 : 111a, 111b

VEHICLE AND CONTROL METHOD OF VEHICLE

CROSS-REFERENCE TO RELATED APPLICATION

This application claims the benefit of priority to Korean Patent Application No. 10-2018-0116412, filed on Sep. 28, 2018 in the Korean Intellectual Property Office, the disclosure of which is incorporated herein by reference.

TECHNICAL FIELD

The present disclosure relates to a vehicle and a control method of the vehicle, capable of predicting a collision and preventing generation of a fragment caused by the collision.

BACKGROUND

As the technology develops, vehicles can provide a driver with various functions. Specifically, according to the electronization trend of vehicles, a vehicle having an active safety system (ASS), which is self-operated so as to prevent an accident, has been introduced.

However, in spite of collision prediction through the ASS, collision accidents occur frequently and secondary accidents occur frequently due to generation of fragments caused by the collision accidents. Accordingly, in recent years, research has been actively carried out on a vehicle capable of preventing generation of fragments caused by a collision.

SUMMARY

It is an aspect of the present disclosure to provide a vehicle for predicting a collision and injecting a material, which absorbs an impact at a portion at which the collision is predicted and enhances coupling strength at a portion to which the material is attached, and a control method of the vehicle.

Additional aspects of the disclosure will be set forth in part in the description which follows, and, in part, will be obvious from the description, or may be learned by practice of the disclosure.

In accordance with one aspect of the present disclosure, a vehicle includes: a sensor for measuring a relative position and a relative speed between an obstacle and the vehicle; an injector for injecting a deforming material which is solidified during injection to absorb an impact and enhance coupling strength at a portion onto which the deforming material is injected; and a controller configured to determine a collision probability with the obstacle on the basis of the measured relative position and the measured relative speed, to determine a predicted collision position when the collision probability reaches a reference collision probability, to determine an injection direction of the injector on the basis of the predicted collision position, and to control the injector to inject the deforming material in the determined injection direction.

The controller may calculate a time to collision (TTC) between the obstacle and the vehicle on the basis of the measured relative position and the measured relative speed, and when the calculated TTC is equal to or less than a predetermined critical time, the controller may determine the collision probability reaches the reference collision probability.

The sensor may detect deceleration of the vehicle, and when a distance between the obstacle and the vehicle, which is represented by the measured relative position, is equal to or less than a critical distance and deceleration is equal to or greater than a critical deceleration, the controller may determine the collision probability reaches the reference collision probability.

The sensor may detect at least one of a steering angle and a steering angular velocity of the vehicle, and when a distance between the obstacle and the vehicle, which is represented by the measured relative position, is equal to or less than a critical distance and the steering angle is equal to or greater than a critical steering angle or the steering angular velocity is equal to or greater than a critical steering angular velocity, the controller may determine the collision probability reaches the reference collision probability.

When the collision probability reaches the reference collision probability, the controller may determine a predicted collision speed on the basis of the measured relative position and the measured relative speed, and when a predicted collision speed is equal to or greater than a critical collision speed, the controller may control the injector to inject the deforming material in the determined injection direction.

The controller may determine an injection amount of the deforming material on the basis of the predicted collision speed.

The predicted collision position may be at least one among a front left side, a front right side, a left side, a right side, a rear left side, and a rear right side of the vehicle.

The controller may determine an angle of the injector to direct the injector to the determined injection direction.

The injector may include at least one among a front injection hole provided at a hood, a left injection hole provided at a left door, a right injection hole provided at a right door, a rear injection hole provided at a trunk lid, a left side mirror injection hole provided at a left side mirror, and a right side mirror injection hole provided at a right side mirror.

The controller may determine an injection hole corresponding to the determined injection direction and control the injector to inject the deforming material in the determined injection hole.

The controller may control the determined injection hole to be directed to the determined injection direction.

The vehicle may further include an output device configured to visually or audibly output the collision probability and the injection direction.

In accordance with another aspect of the present disclosure, a control method of a vehicle includes steps of: measuring a relative position and a relative speed between an obstacle and the vehicle; determining a collision probability with the obstacle on the basis of the measured relative position and the measured relative speed; when the collision probability reaches a reference collision probability, determining a predicted collision position, determining an injection direction of an injector for injecting a deforming material which is solidified during injection to absorb an impact and enhance coupling strength at a portion onto which the deforming material is injected on the basis of the predicted collision position; and controlling the injector to inject the deforming material in the determined injection direction.

The determining of the collision probability may include calculating a time to collision (TTC) between the obstacle and the vehicle on the basis of the measured relative position and the measured relative speed, and when the calculated TTC is equal to or less than a predetermined critical time, determining the collision probability reaches the reference collision probability.

The determining of the collision probability may include detecting deceleration of the vehicle, and when a distance between the obstacle and the vehicle, which is represented by the measured relative position, is equal to or less than a critical distance and deceleration is equal to or greater than a critical deceleration, determining the collision probability as being exist.

The determining of the collision probability may include detecting at least one of a steering angle and a steering angular velocity of the vehicle, and when a distance between the obstacle and the vehicle, which is represented by the measured relative position, is equal to or less than a critical distance and the steering angle is equal to or greater than a critical steering angle or the steering angular velocity is equal to or greater than a critical steering angular velocity, determining the collision probability reaches the reference collision probability.

The controlling of the injector may include, when the collision probability reaches the reference collision probability, determining a predicted collision speed on the basis of the measured relative position and the measured relative speed, and when the predicted collision speed is equal to or greater than a critical collision speed, controlling the injector to inject the deforming material in the determined injection direction.

The control method may further include determining an injection amount of the deforming material on the basis of the predicted collision speed.

The predicted collision position may be at least one among a front left side, a front right side, a left side, a right side, a rear left side, and a rear right side of the vehicle.

The control method may further include determining an angle of the injector to be directed to the determined injection direction.

The injector may include at least one among a front injection hole provided at a hood, a left injection hole provided at a left door, a right injection hole provided at a right door, a rear injection hole provided at a trunk lid, a left side mirror injection hole provided at a left side mirror, and a right side mirror injection hole provided at a right side mirror.

The controlling of the injector may include determining an injection hole corresponding to the determined injection direction, and controlling the injector to inject the deforming material in the determined injection hole.

The controlling of the injector may include controlling the determined injection hole to be directed to the determined injection direction.

In accordance with still another aspect of the present disclosure, a vehicle includes a sensor configured to measure an air pressure of a tire, an injector configured to inject a deforming material which is solidified during injection to absorb an impact and enhance coupling strength at a portion to which the deforming material is attached, and a controller configured to determine a puncture probability of the tire on the basis of the measured air pressure and control the injector to inject a deforming material in a direction of the tire when the puncture probability reaches a reference puncture probability; and an output device configured to visually or audibly output the puncture probability.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
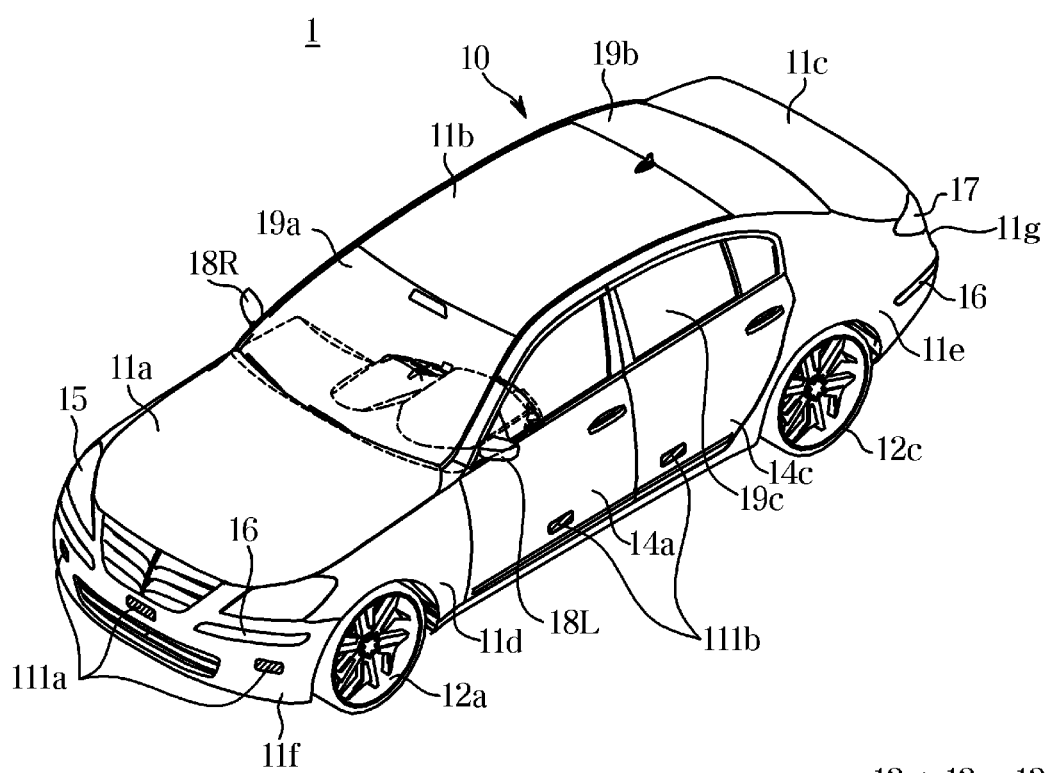
FIG. 1 is a schematic perspective view illustrating an appearance of a vehicle according to one exemplary embodiment of the present disclosure.

Like reference numerals refer to like components throughout this disclosure. This specification does not describe all components of embodiments, and a common description in the technical field to which the present disclosure pertains and an overlapping description between the embodiments will be omitted.

Throughout this specification, when a part is referred to as being "connected" to other part, it includes not only a direct connection but also an indirect connection, and the indirect connection includes a connection through a wireless communication network.

Further, when a part is referred to as "including" a component, this refers that the part can include another element, not excluding another element unless specifically stated otherwise.

The singular forms include plural forms unless the context clearly notes otherwise.

Further, the terms "~ part," "~ er," "~ block," "~ module," and the like may mean a unit for processing at least one function or operation. For example, these terms may mean at least one process which is performed by at least one hardware such as a field-programmable gate array (FPGA) and an application specific integrated circuit (ASIC), at least one software stored in a memory, or a processor.

A reference numeral, which is assigned to each step, is used for discriminating each step and does not describe the order of the steps, and these steps may be differently performed from the described order unless clearly specified in the context.

Hereinafter, embodiments of a vehicle and a controlling method of the vehicle according to one aspect will be described in detail with reference to the accompanying drawings.

Figure 2:
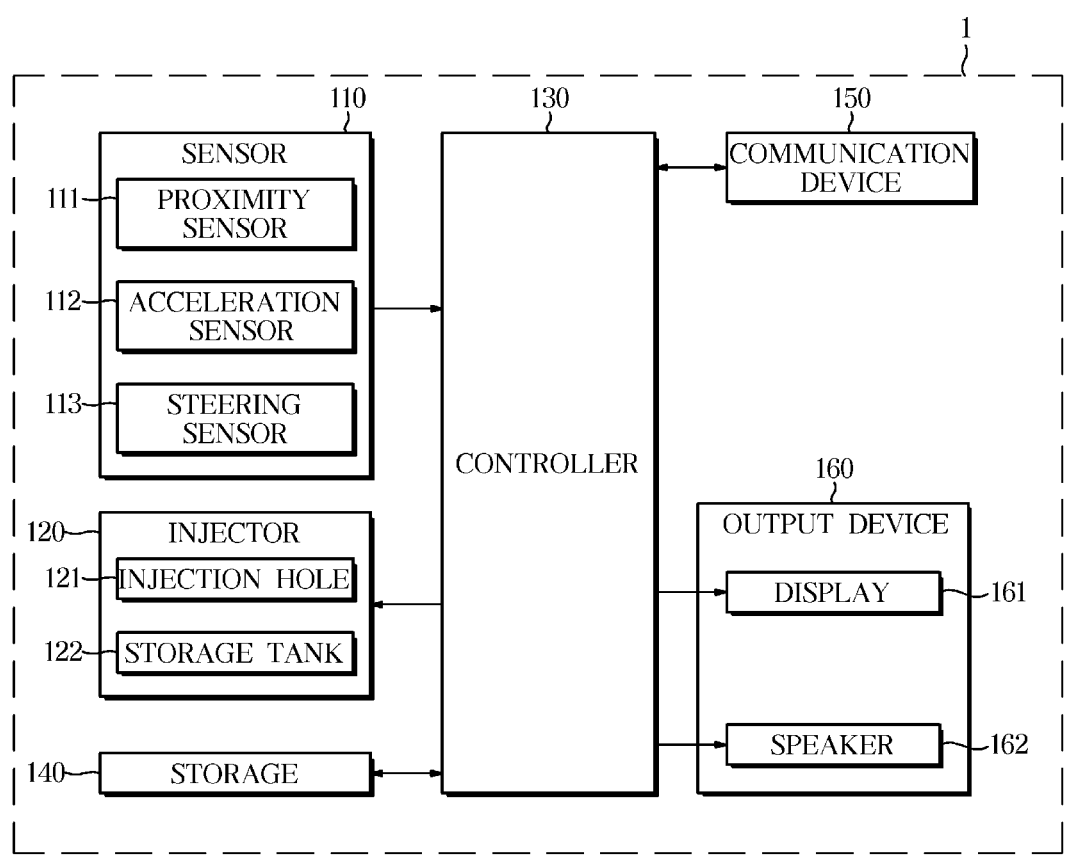
FIG. 2 is a control block diagram of a vehicle according to one exemplary embodiment of the present disclosure.

FIG. 1 is a schematic perspective view illustrating an appearance of a vehicle 1 according to one embodiment, and FIG. 2 is a control block diagram of the vehicle 1 according to one embodiment.

Referring to FIG. 1, the vehicle 1 may include a vehicle body 10 forming the appearance of the vehicle 1 and include a plurality of wheels 12 for moving the vehicle 1.

The vehicle body 10 includes a hood 11a for protecting various devices such as an engine and the like required for driving the vehicle 1, a roof panel 11b for forming an interior space, a trunk lid 11c having an accommodation space, a front fender 11d provided at a lateral side surface of the vehicle 1, a quarter panel 11e, a front bumper 11f provided to protect a front side of the vehicle body 10 of the vehicle 1, and a rear bumper 11g provided to protect a rear side of the vehicle body 10 of the vehicle 1.

Further, a plurality of doors 14 hinge-coupled to the vehicle body 10 may be provided at the side surface of the vehicle body 10. The plurality of doors 14 may include a front left door 14a provided at a front left side of the vehicle body 10, a front right door (not shown) provided at a front right side thereof, a rear left door 14c provided at a rear left side thereof, and rear right door (not shown) provided at a rear right side thereof. However, according to a type of a vehicle, the rear left door 14c and the rear right door (not shown) may be omitted.

Further, side mirrors 18L and 18R are provided at the front left door 14a and the front right door (not shown) of an exterior of the vehicle body 10 to provide a rear view and a side view of the vehicle 1. Each of the side mirrors 18L and 18R includes a mirror for providing a user with a rear view and a side view and a cover forming an appearance of each of the side mirrors 18L and 18R.

A front window 19a may be provided between the hood 11a and the roof panel 11b to provide a front view of the vehicle 1, and a rear window 19b may be provided between the roof panel 11b and the trunk lid 11c to provide a rear view of the vehicle 1. Further, a side window 19c may be provided at an upper portion of each of the plurality of doors 14 to provide a side view of the vehicle 1.

Furthermore, a headlamp 15 may be provided at a front of the vehicle 1 to irradiate lighting in a traveling direction of the vehicle 1.

Moreover, a turn signal lamp 16 may be provided at the front and a rear of the vehicle 1 to indicate a turning direction of the vehicle 1. The turn signal lamp 16 may flicker to indicate the turning direction of the vehicle 1.

Further, a tail lamp 17 may be provided at the rear of the vehicle 1. The tail lamp 17 may be provided at the rear of the vehicle 1 to display a gear shift state of the vehicle 1, a brake operation state thereof, and the like.

The plurality of wheels 12 may include a front left wheel 12a provided at the front left side of the vehicle 1, a front right wheel (not shown) provided at the front right side thereof, a rear left wheel 12c provided at the rear left side thereof, and a rear right wheel (not shown) provided at the rear right side thereof, and each of the plurality of wheels 12 may include a tire.

Further, the vehicle 1 includes a proximity sensor 111 for detecting an obstacle at a front side, a lateral side, or a rear side of the vehicle 1. A plurality of proximity sensors 111 may be provided at the vehicle 1 as necessary. In FIG. 1, three proximity sensors 111a have been illustrated as being provided at the front bumper 11f and two proximity sensors 111b have been illustrated as being provided at the plurality of doors 14, but the provisioned positions and the number of the proximity sensors 111 are not limited thereto.

In this case, the obstacle may correspond to a vehicle other than the vehicle 1 and may be a pedestrian, an object on a road, or the like. Further, the obstacle may include an object such as a guard rail, a wall of a building, a tree alongside the road, a pole, or the like which may collide with the vehicle 1.

For example, at least one proximity sensor 111 may be provided at the rear bumper 11g, and at least one proximity sensor 111 may also be provided at the front right door (not shown) and the rear right door (not shown). A description of the proximity sensor 111 will be described in detail below.

Referring to FIG. 2, the vehicle 1 according to one embodiment includes a sensor 110 for detecting at least one among a front obstacle, a lateral side obstacle, a rear obstacle, deceleration, and a steering variation of the vehicle 1, an injector 120 for injecting a deforming material which is solidified during injection to absorb an impact and enhance coupling strength at a portion to which the material is attached, a controller 130 for determining a collision probability with an obstacle and controlling the injector 120 to inject a deforming material at a predicted collision position, a storage 140 for storing driving pattern information and accident history information, a communication device 150 for transmitting and receiving information to and from an external server, and an output device 160 for visually or audibly outputting the collision probability and an injection direction of the deforming material.

The sensor 110 according to one embodiment may detect an obstacle which is located a front side, a lateral side, or a rear side of the vehicle 1. Specifically, the proximity sensor 111 included in the sensor 110 is provided at the vehicle body 10 of the vehicle 1 to detect the front obstacle, the side obstacle, and the rear obstacle.

For example, the proximity sensor 111 may include at least one of a radio detecting and ranging (RADAR) sensor or a light detecting and ranging (LiDAR) sensor.

A radar sensor means a sensor which irradiates an object with electromagnetic waves (e.g., radio waves, microwaves, and the like) and receives electromagnetic waves reflected from the object to detect a distance, a direction, an altitude, and speed of the object. The RADAR sensor may include a radar antenna for transmitting electromagnetic waves or receiving electromagnetic waves reflected from the object.

The LiDAR sensor means a sensor which irradiates an object with a laser (e.g., infrared rays, visible rays, or the like) having a wavelength shorter than that of an electromagnetic wave and receives light reflected from the object to detect a distance, a direction, an altitude, and speed of the object. The LiDAR sensor may include a light source for emitting a laser and a receiver for receiving reflected light. The LiDAR sensor has high azimuth resolution and distance resolution as compared with the RADAR sensor.

That is, the proximity sensor 111 may be provided as at least one of the RADAR sensor and the LiDAR sensor to detect the front obstacle, the side obstacle, or the rear obstacle and measure a relative position and a relative speed between the detected obstacle and the vehicle 1.

Specifically, the proximity sensor 111 may be provided at the front, the rear, and the side of the vehicle 1 to detect an obstacle, and thus the proximity sensor 111 may determine in which direction the detected obstacle is located relative to the vehicle 1. Consequently, the sensor 110 may measure the relative position between the detected obstacle and the vehicle 1.

For example, when a proximity sensor 111*a* provided at the left side of the front bumper 11*f* of the vehicle 1 detects an obstacle, the sensor 110 measures a relative position of the detected obstacle from the vehicle 1 to a front left side thereof.

Further, the proximity sensor 111 may irradiate electromagnetic waves, receive the electromagnetic waves reflected from an object, and measure a relative speed between the detected obstacle and the vehicle 1 on the basis of a distance variation between the continuously measured detected obstacle and the vehicle 1.

However, a type of the proximity sensor 111 is not limited to the RADAR sensor or the LiDAR sensor, and according to embodiments, the proximity sensor 111 may further include an ultrasonic sensor for outputting ultrasonic waves and measuring a relative position and a relative speed between an obstacle and the vehicle 1 and a camera for capturing an image and measuring a relative position and a relative speed between the obstacle and the vehicle 1.

The controller 130, which will be described below, may determine a collision probability between the obstacle and the vehicle 1 on the basis of the relative position and the relative speed between the obstacle and the vehicle 1, which are measured by the sensor 110. A description for the determination of the collision probability will be described in detail below.

The sensor 110 according to one embodiment may be provided in the vehicle 1 and may include an acceleration sensor 112 for detecting acceleration and deceleration of the vehicle 1.

Specifically, the acceleration sensor 112 measures the acceleration and deceleration of the vehicle 1 so that the controller 130, which will be described below, may determine whether the vehicle 1 is suddenly braked. However, according to embodiments, various sensors may be provided to determine whether the vehicle 1 is suddenly braked, and for example, a brake sensor for determining whether a brake operates may be substituted for the acceleration sensor 112.

The sensor 110 according to one embodiment may include a steering sensor 113 for measuring a steering change of the vehicle 1.

The steering sensor 113 according to one embodiment may be provided at a steering shaft of a steering wheel and may detect a steering input according to a driver's manipulation of the steering wheel, thereby detecting a change in steering angle or steering angular velocity.

The controller 130, which will be described below, may determine whether the vehicle 1 turns rapidly on the basis of the steering angle and steering angular velocity which are measured from the steering sensor 113.

The injector 120 according to one embodiment injects the deforming material which is solidified during injection to absorb an impact and enhance coupling strength at a portion to which the deforming material is attached.

Specifically, the injector 120 is controlled by the controller 130, which will be described below, and when a collision probability exists, the injector 120 may inject the deforming material into the vehicle body 10 before a collision to prevent generation of a fragment from the vehicle body 10 when the collision occurs.

That is, the deforming material is solidified during injection to absorb the impact generated at the time of a collision and enhance the coupling strength at the portion to which the deforming material is attached, thereby preventing the generation of the fragment from the vehicle body 10.

Liquid rubber which is solidified during injection may be used as the deforming material, and a material may be used without limitation as long as it can absorb an impact and enhances coupling strength at a portion to which the material is attached.

The injector 120 is provided at the front, side, and rear of the vehicle body 10 and includes an injection hole 121 for injecting a deforming material and a storage tank 122 for storing the deforming material.

The injection hole 121 may be provided at the hood 11*a*, the plurality of doors 14, the trunk lid 11*c*, a side mirror 18 of the vehicle 1, and the like, and the injection hole 121 may be provided at any position at which the injection hole 121 is capable of injecting the deformable material into the vehicle body 10 without limitation.

The injection hole 121 according to one embodiment may be rotated for injection of the deforming material toward a predicted collision position under the control of the controller 130, which will be described below, and may further include a motor (not shown) for rotation of the injection hole 121. However, in addition to the motor (not shown), a configuration may be used without limitation as long as it can deliver a rotating force to the injection hole 121.

The storage tank 122 may store the deforming material in a liquid state and transfer the liquid deforming material to the injection hole 121. The storage tank 122 may be disposed in an engine room of the vehicle 1 and may be disposed without limitation at a position at which the storage tank 122 is capable of transferring the liquid deforming material to the injection hole 121.

The controller 130 according to one embodiment may determine a collision probability with the obstacle on the basis of the relative position and the relative speed between the obstacle and the vehicle 1, which are measured by the proximity sensor 111 of the sensor 110.

Specifically, the controller 130 may calculate a time to collision (TTC) on the basis of the relative position and the relative speed between the obstacle and the vehicle 1, which are measured by the sensor 110, and when the calculated TTC is equal to or less than a predetermined critical time, the controller 130 may determine that a collision probability exists.

The predetermined critical time may be a maximum time at which the collision probability between the obstacle and the vehicle 1 exists and may be set at a design stage of the vehicle 1.

That is, when the TTC is equal to or less than the predetermined critical time, even though a driver of the vehicle 1 performs braking or rotates a steering wheel, the collision probability may exist.

The controller 130 according to one embodiment may determine a collision probability with the obstacle on the basis of the acceleration and the deceleration which are measured by the acceleration sensor 112 of the sensor 110.

Specifically, when the measured deceleration is equal to or greater than critical deceleration, the controller 130 may determine that rapid braking for avoiding a collision is performed and may determine a collision probability on the basis of the determination result.

For example, when a distance between an obstacle and the vehicle 1, which is indicated by the relative position between the obstacle and the vehicle 1 measured by the sensor 110, is equal to or less than the predetermined critical distance and the deceleration measured by the sensor 110 is equal to or greater than the predetermined critical deceleration, the controller 130 may determine that the rapid braking for avoiding a collision is performed and the collision probability exists.

The predetermined critical distance may correspond to a distance in which a collision probability between the vehicle 1 and the obstacle exists according to whether the vehicle 1 is braked and may be set at the design stage of the vehicle 1.

Further, the predetermined critical deceleration may correspond to reference deceleration for determining whether rapid braking is performed and may be set on the basis of driving pattern information which represents a driving pattern of the driver.

Specifically, the controller 130 may generate the driving pattern information representing the driving pattern of the driver on the basis of the acceleration and the deceleration which are measured by the acceleration sensor 112 and may store the generated driving pattern information in the storage 140 which will be described below.

That is, the controller 130 may continuously update the driving pattern information on the basis of acceleration and deceleration which are measured while the vehicle 1 is running, and the updated driving pattern information may be stored in the storage 140 which will be described below.

Accordingly, the driving pattern information stored in the storage 140 may represent the driving pattern of the driver. For example, the driving pattern information may include information on average acceleration, maximum acceleration, average deceleration, and maximum deceleration of the vehicle 1.

The controller 130 may set a value, which is equal to or greater than a predetermined deceleration range beyond the maximum deceleration, as a critical deceleration on the basis of the driving pattern information.

Accordingly, when the vehicle 1 is decelerated beyond the critical deceleration, the controller 130 may determine a state in which the vehicle 1 is rapidly braked on the basis of the driving pattern of the driver.

Consequently, when an obstacle is present within the critical distance and deceleration of the vehicle 1 is decelerated beyond the critical deceleration, the controller 130 may determine that rapid braking for avoiding a collision is performed and a collision probability between the obstacle and the vehicle 1 exists.

The controller 130 according to one embodiment may determine a collision probability with the obstacle on the basis of the steering angle and the steering angular velocity which are measured by the steering sensor 113 of the sensor 110.

Specifically, when the measured steering angle and the measured steering angular velocity are respectively equal to or greater than a critical steering angle and a critical steering angular velocity, the controller 130 may determine that rapid turning for avoiding a collision is performed and may determine a collision probability on the basis of the determination result.

Further, when the measured steering angle is equal to or greater than the critical steering angle or the measured steering angular velocity is equal to or greater than the critical steering angular velocity, the controller 130 may determine that the rapid turning for avoiding a collision is performed and may determine a collision probability on the basis of the determination result.

For example, when a distance between an obstacle and the vehicle 1, which is indicated by the relative position between the obstacle and the vehicle 1 measured by the sensor 110, is equal to or less than a critical distance, and the steering angle and the steering angular velocity, which are measured by the sensor 110, are respectively equal to or greater than the critical steering angle and the critical steering angular velocity, the controller 130 may determine that the rapid turning for avoiding a collision is performed and that the collision probability exists.

The critical distance may correspond to a distance in which a collision probability between the vehicle 1 and the obstacle exists according to whether the vehicle 1 turns and may be set at the design stage of the vehicle 1.

Further, the critical steering angle and the critical steering angular velocity may respectively correspond to a reference steering angle and a reference steering angular velocity, which are used to determine whether rapid turning is performed and may be set on the basis of the driving pattern information which represents the driving pattern of the driver.

Specifically, the controller 130 may generate the driving pattern information representing the driving pattern of the driver on the basis of the steering angle and the steering angular velocity which are measured by the steering sensor 113 and may store the generated driving pattern information in the storage 140 which will be described below.

That is, the controller 130 may continuously update the driving pattern information on the basis of a steering angle and a steering angular velocity which are measured while the vehicle 1 is running, and the updated driving pattern information may be stored in the storage 140 which will be described below.

Accordingly, the driving pattern information stored in the storage 140 may represent the driving pattern of the driver. For example, the driving pattern information may include information on an average steering angle, a maximum steering angle, an average steering angular velocity, and a maximum steering angular velocity of the vehicle 1.

The controller 130 may set a value, which is equal to or greater than a predetermined angle range beyond the maximum steering angle, as the critical steering angle on the basis of the driving pattern information and may set a value, which is equal to or greater than a predetermined angular velocity range beyond the maximum steering angular velocity, as the critical steering angular velocity on the basis of the driving pattern information.

Accordingly, when the vehicle 1 turns beyond the critical steering angle and the critical steering angular velocity, the controller 130 may determine a state in which the vehicle 1 turns rapidly on the basis of the driving pattern of the driver.

Consequently, when an obstacle is present within the critical distance and the vehicle 1 turns beyond the critical steering angle and the critical steering angular velocity, the controller 130 may determine that rapid turning for avoiding a collision is performed and a collision probability exists between the obstacle and the vehicle 1, that is, the collision probability reaches a reference collision probability.

When the collision probability exists, the controller 130 according to one embodiment may determine a predicted collision position on the basis of the relative position between the obstacle and the vehicle 1.

The predicted collision position may be determined on the basis of a front side, a rear lateral side, a left side, and a right side of the vehicle 1.

When the collision probability exists, the controller 130 according to one embodiment may determine a predicted collision speed on the basis of the relative position and the relative speed which are measured by the sensor 110.

That is, the controller 130 may determine the predicted collision speed on the basis of a distance between the obstacle and the vehicle 1, which is represented by the measured relative position, and the relative speed between the obstacle and the vehicle 1.

When the predicted collision speed is equal to or greater than a critical collision speed, the controller 130 may control the injector 120 to inject the deforming material.

In this case, the controller 130 may set the critical collision speed on the basis of accident history information stored in the storage 140 which will be described below.

The accident history information corresponds to information received and transmitted through an external server and includes information on previous accident history. Specifically, the information on the previous accident history may include information on a relationship between a collision speed and whether a fragment is generated due to a collision.

That is, the controller 130 may set a minimum collision speed, at which a fragment is generated, to the critical collision speed on the basis of the accident history information.

The critical collision speed according to one embodiment may be set differently according to a material of the vehicle body 10 of the vehicle 1 which is positioned at the predicted collision position.

Specifically, when the vehicle body 10 of the vehicle 1 positioned at a predicted collision position is made of a material which easily breaks, which is used in the headlamp 15, the turn signal lamp 16, or the tail lamp 17, the controller 130 may reset the set critical collision speed to be low.

Accordingly, when a material which is likely to generate a fragment even at a low critical collision speed is located at the predicted collision position, the controller 130 may reset the critical collision speed to be lower than the set critical collision speed to prevent generation of a fragment.

Accordingly, the controller 130 may control the injector 120 to inject the deforming material only when the fragment is to be determined as being generated. In other words, in the case of a minor fender-bender, the controller 130 may prevent the injector 120 from injecting the deforming material, thereby preventing an unnecessary injection of the deforming material.

Further, the controller 130 according to one embodiment may determine an injection amount of the deforming material on the basis of the predicted collision speed.

Specifically, when the predicted collision speed is equal to or greater than the critical collision speed, the controller 130 may increase the injection amount of the deforming material in proportion to the predicted collision speed. For example, the controller 130 may determine an injection amount of the deforming material at the critical collision speed as a reference injection amount and may determine the injection amount of the deforming material to increase relative to the reference injection amount in proportion to a difference between the critical collision speed and the predicted collision speed.

The injection amount increasing in proportion to the reference injection amount and the difference between the critical collision speed and the predicted collision speed may be determined in the design stage of the vehicle 1 to be stored in the storage 140 or may be received from the external server through the communication device 150 in a predetermined information form.

Consequently, the vehicle 1 may adaptively adjust the injection amount of the deforming material on the basis of the predicted collision speed and may more effectively absorb an impact caused by a collision and prevent generation of a fragment.

The controller 130 according to one embodiment may determine an injection direction of the injector 120 on the basis of the predicted collision position. That is, the controller 130 may determine to direct an injection direction of the injector 120 to a predicted collision position, at which a collision is predicted to occur, so as to inject the deforming material.

In other words, the controller 130 may determine an angle of the injector 120 to direct an injection direction of the injector 120 to the predicted collision position.

The controller 130 according to one embodiment may control the injector 120 to inject the deforming material in the determined injection direction.

Specifically, the controller 130 may determine an injection hole 121 corresponding to the determined injection direction and control the injector 120 to inject the deforming material through the determined injection hole 121. In this case, the controller 130 may control the determined injection hole 121 to be rotated toward the injection direction.

Consequently, even though an obstacle collides with the vehicle 1 at the predicted collision position, an impact caused by the collision may be alleviated, and generation of a fragment caused by the collision may be prevented to prevent a second accident due to the fragment. A description of the injection of the deforming material will be described in detail below.

The controller 130 according to one embodiment may control the output device 160, which will be described below, to visually or audibly output a collision probability and an injection direction. Consequently, the driver may recognize the collision probability more quickly and determine the injection direction.

The controller 130 may include at least one memory for storing a program of performing the above-described operations and operations which will be described below, and at least one processor for executing the stored program. When a plurality of memories and a plurality of processors are provided, the plurality of memories and the plurality of processors may be integrated on one chip or may be provided at physically separated positions. For example, the controller 130 may be an electronic control unit (ECU) for controlling all the electrical systems in a vehicle.

The storage 140 according to one embodiment may store driving pattern information generated on the basis of the acceleration and the deceleration which are measured by the acceleration sensor 112 and may store driving pattern information generated on the basis of the steering angle and the steering angular velocity which are measured by the steering sensor 113.

The storage 140 according to one embodiment may store the accident history information received from the external server and may store various information relating to the vehicle 1.

To store the various information, the storage 140 may be implemented with at least one among a nonvolatile memory device such as a cache, a read only memory (ROM), a programmable ROM (PROM), an erasable and programmable ROM (EPROM), an electrically EPROM (EEPROM), or a flash memory, a volatile memory device such as a random access memory (RAM), a storage medium such as a hard disk drive (HDD), or a compact disc ROM (CD-ROM), but the present disclosure is not limited thereto.

The communication device 150 according to one embodiment may transmit and receive information to and from the external server. For example, the communication device 150 may receive the accident history information, which represents the relationship between the collision speed and whether a fragment is generated due to the collision, from the external server.

Accordingly, the communication device 150 may communicate with the external server using various methods. The communication device 150 may transmit and receive information to and from the external server using various methods such as a radio frequency (RF), a wireless fidelity (Wi-Fi), Bluetooth, Zigbee, a near field communication (NFC), ultra-wide band (UWB) communication. A method of communicating with the external server is not limited to the above-described methods, and any method may be employed as long as it can communicate with the external server.

Further, the communication device 150 has been illustrated as being a single component for transmitting and receiving a signal in FIG. 2, but the present disclosure is not limited thereto, and a transmitter (not shown) for transmitting a signal and a receiver (not shown) for receiving a signal may be separately configured.

The output device 160 according to one embodiment may visually or audibly output the collision probability and the injection direction under the control of the controller 130.

Specifically, the output device 160 may include a display 161 capable of visually outputting the collision probability and the injection direction.

The display 161 may be provided inside the vehicle 1 and may include a panel. The panel may be one among a cathode ray tube (CRT) panel, a liquid crystal display (LCD) panel, a light emitting diode panel, an organic light emitting diode (OLED) panel, a plasma display panel (PDP), and a field emission display (FED) panel.

Further, the output device 160 may include a speaker 162 capable of audibly outputting the collision probability and the injection direction, and the speaker 162 may be provided inside the vehicle 1.

Figure 3:
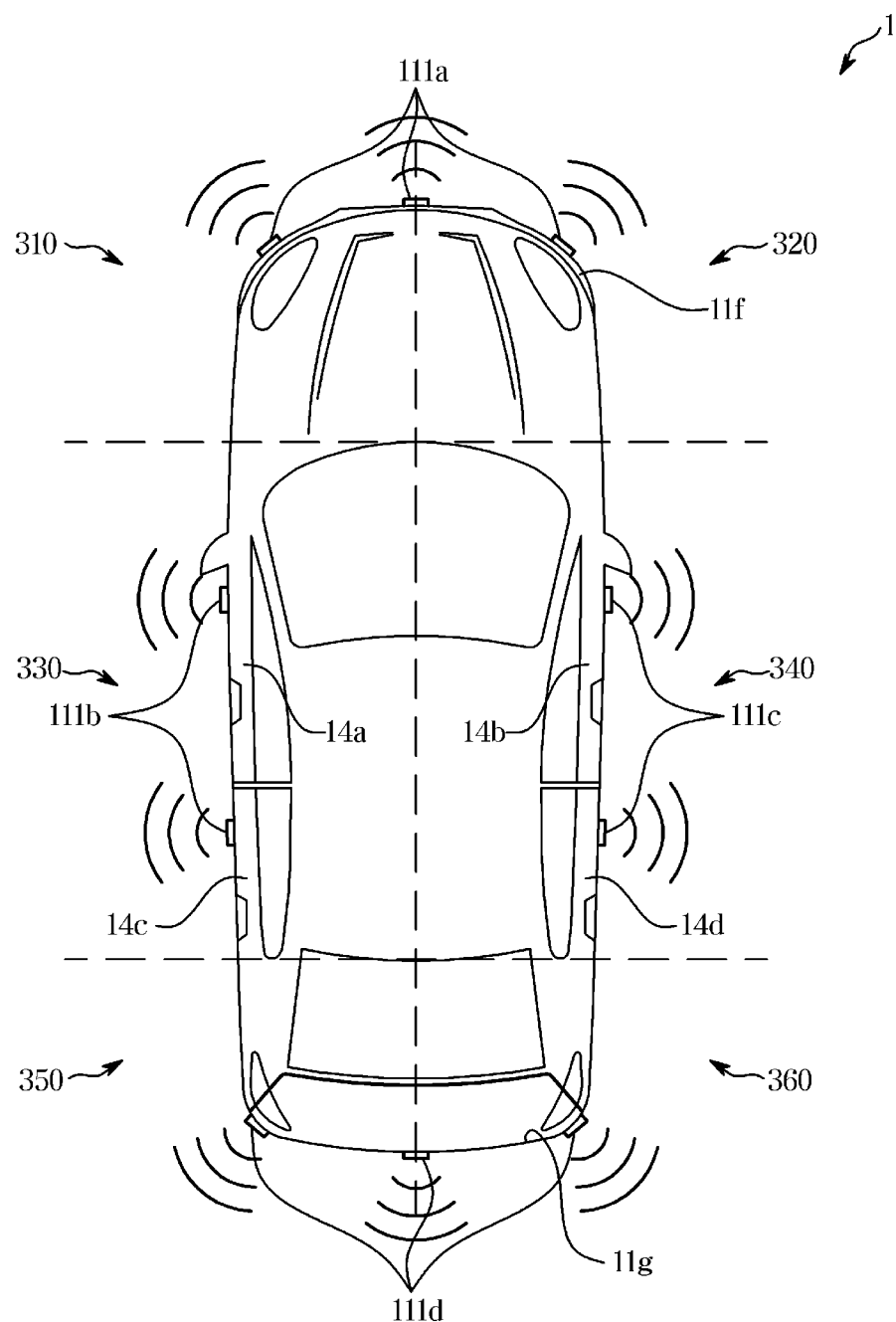
FIG. 3 is a diagram illustrating a predicted collision position of the vehicle according to one exemplary embodiment of the present disclosure.

FIG. 3 is a diagram illustrating a predicted collision position of the vehicle 1 according to one embodiment.

Referring to FIG. 3, the sensor 110 according to one embodiment may detect an obstacle which is located at a front side, a lateral side, or a rear side of the vehicle 1. Specifically, the proximity sensor 111 included in the sensor 110 is provided at the vehicle body 10 of the vehicle 1 to detect a front obstacle, a lateral obstacle, and a rear obstacle.

For example, the proximity sensor 111 may be provided as at least one of a RADAR sensor and a LiDAR sensor.

That is, the proximity sensor 111 may be provided as at least one of the RADAR sensor and the LiDAR sensor to detect the front obstacle, the lateral obstacle, or the rear obstacle and measure a relative position and a relative speed between the detected obstacle and the vehicle 1.

Specifically, the proximity sensor 111 may be provided at the front, the rear, and the lateral side of the vehicle 1 to detect an obstacle, and thus the proximity sensor 111 may determine in which direction the detected obstacle is located relative to the vehicle 1. Consequently, the sensor 110 may measure the relative position between the detected obstacle and the vehicle 1.

For example, when a proximity sensor 111a provided at the left side of the front bumper 11f of the vehicle 1 detects an obstacle, the sensor 110 measures a relative position of the detected obstacle from the vehicle 1 to a front left side thereof.

Further, the proximity sensor 111 may irradiate electromagnetic waves, receive the electromagnetic waves reflected from an object, and measure a relative speed between the detected obstacle and the vehicle 1 on the basis of a distance variation between the continuously measured detected obstacle and the vehicle 1.

To this end, a plurality of proximity sensors 111 may be provided at the vehicle body 10 of the vehicle 1. Specifically, at least one proximity sensor 111 may be provided at the vehicle body 10 of the vehicle 1 in each direction so as to detect obstacles located at a front left side 310, a front right side 320, a left side 330, a right side 340, a rear left side 350, and a rear right side 360 of the vehicle 1.

For example, one proximity sensor 111a may be provided at a left side, a right side, and between the left and right sides of the front bumper 11f, one proximity sensor 111b may be provided at each of the front left door 14a and the rear left door 14c, one proximity sensor 111c may be provided at each of the front right door 14b and the rear right door 14d, and one proximity sensor 111d may be provided at a left side, a right side, and between the left and right sides of the rear bumper 11g.

However, the positions and the number of the proximity sensor 111 may be varied according to embodiments, and any positions and any number of the proximity sensor 111 may be employed as long as they can detect obstacles located at the front left side 310, the front right side 320, the left side 330, the right side 340, the rear left side 350, and the rear right side 360 of the vehicle 1.

Consequently, the proximity sensor 111 of the sensor 110 may detect an obstacle located at the front left side 310, the front right side 320, the left side 330, the right side 340, the rear left side 350, or the rear right side 360 of the vehicle 1 and measure a relative position and a relative speed between the detected obstacle and the vehicle 1.

The controller 130 according to one embodiment may determine a collision probability with the obstacle on the basis of the relative position and the relative speed between the obstacle and the vehicle 1, which are measured by the proximity sensor 111 of the sensor 110.

Specifically, the controller 130 may calculate a time to collision (TTC) on the basis of the relative position and the relative speed between the obstacle and the vehicle 1, which are measured by the sensor 110, and when the calculated TTC is equal to or less than a predetermined critical time, the controller 130 may determine that a collision probability exists.

The predetermined critical time may be a maximum time at which the collision probability between the obstacle and the vehicle 1 exists and may be set at a design stage of the vehicle 1.

That is, when the TTC is equal to or less than the predetermined critical time, even though a driver of the vehicle 1 performs braking or rotates a steering wheel, the collision probability may exist.

The controller 130 according to one embodiment may determine a collision probability with the obstacle on the basis of the acceleration and the deceleration which are measured by the acceleration sensor 112 of the sensor 110.

Specifically, when the measured deceleration is equal to or greater than critical deceleration, the controller 130 may determine that rapid braking for avoiding a collision is performed and may determine a collision probability on the basis of the determination result.

For example, when a distance between an obstacle and the vehicle 1, which is indicated by the relative position between the obstacle and the vehicle 1 measured by the sensor 110, is equal to or less than a critical distance, and the deceleration measured by the sensor 110 is equal to or greater than the critical deceleration, the controller 130 may determine that the rapid braking for avoiding a collision is performed and the collision probability exists.

The critical distance may correspond to a distance in which a collision probability between the vehicle 1 and the obstacle exists according to whether the vehicle 1 is braked and may be set at the design stage of the vehicle 1.

Further, the critical deceleration may correspond to reference deceleration for determining whether rapid braking is performed and may be set on the basis of driving pattern information which represents a driving pattern of the driver.

The controller 130 according to one embodiment may determine a collision probability with the obstacle on the basis of the steering angle and the steering angular velocity which are measured by the steering sensor 113 of the sensor 110.

Specifically, when the measured steering angle and the measured steering angular velocity are respectively equal to or greater than a critical steering angle and a critical steering angular velocity, the controller 130 may determine that rapid turning for avoiding a collision is performed and may determine a collision probability on the basis of the determination result.

For example, when a distance between an obstacle and the vehicle 1, which is indicated by the relative position between the obstacle and the vehicle 1 measured by the sensor 110, is equal to or less than a critical distance, and the steering angle and the steering angular velocity, which are measured by the sensor 110, are respectively equal to or greater than the critical steering angle and the critical steering angular velocity, the controller 130 may determine that the rapid turning for avoiding a collision is performed and the collision probability exists.

The critical distance may correspond to a distance in which a collision probability between the vehicle 1 and the obstacle exists according to whether the vehicle 1 turns and may be set at the design stage of the vehicle 1.

Further, the critical steering angle and the critical steering angular velocity may respectively correspond to a reference steering angle and a reference steering angular velocity, which are used to determine whether rapid turning is performed and may be set on the basis of the driving pattern information which represents the driving pattern of the driver.

When the collision probability exists, the controller 130 according to one embodiment may determine a predicted collision position on the basis of the relative position between the obstacle and the vehicle 1.

The predicted collision position may be at least one among the front left side 310, the front right side 320, the left side 330, the right side 340, the rear left side 350, and the rear right side 360 of the vehicle 1.

Figure 4:
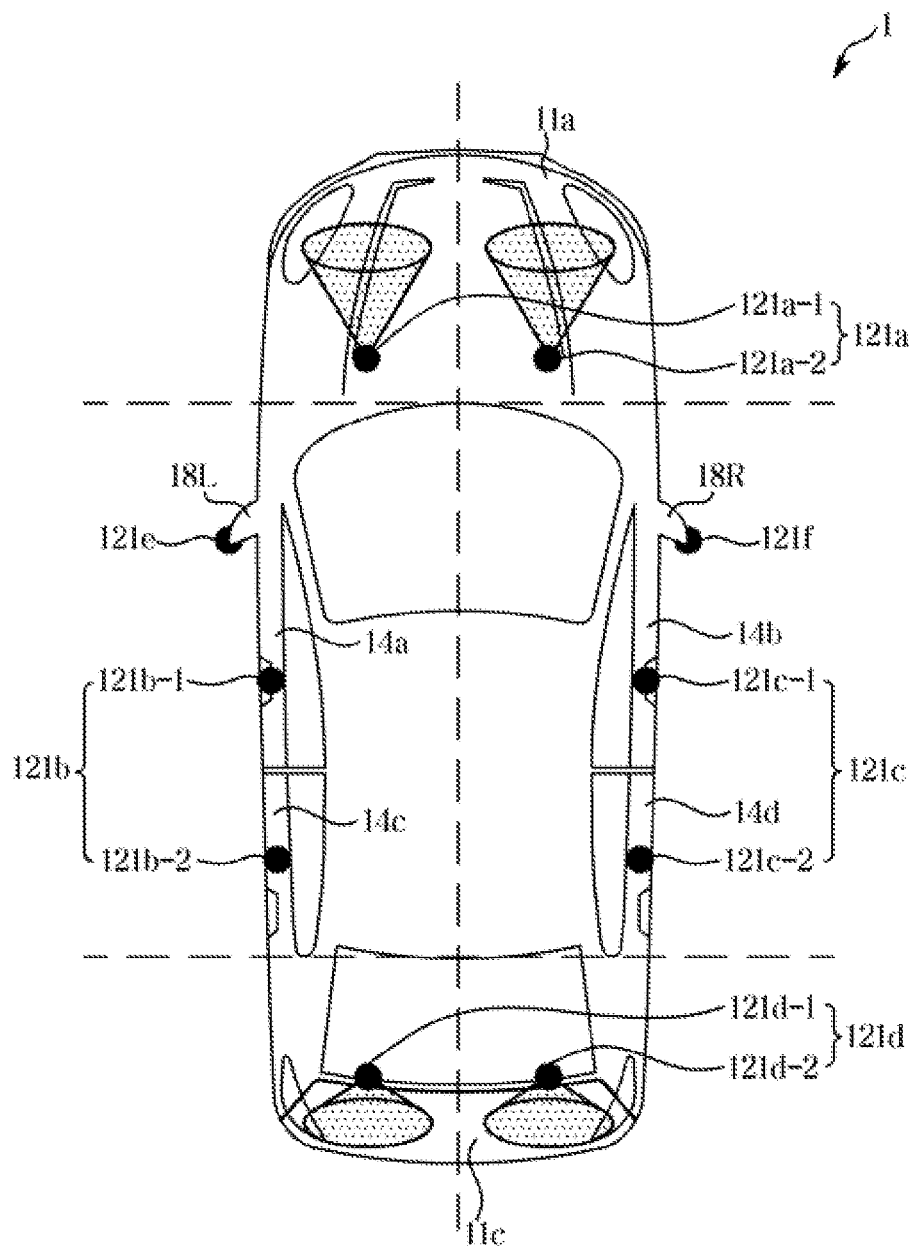
FIG. 4 is a diagram illustrating a position of an injection hole provided at an injector according to one exemplary embodiment of the present disclosure.

FIG. 4 is a diagram illustrating a position of the injection hole 121 provided at the injector 120 according to one embodiment.

Referring to FIG. 4, the injector 120 according to one embodiment is provided at the vehicle body 10 of the vehicle 1 to inject the deforming material, which is solidified during injection to absorb an impact and enhance coupling strength of a portion to which the deforming material is attached, onto a predicted collision position.

In this case, the injector 120 may include a plurality of injection holes 121 provided at the vehicle body 10 of the vehicle 1. The injector 120 may include the plurality of injection holes 121 to inject the deforming material onto the predicted collision position which is at least one among the front left side 310, the front right side 320, the left side 330, the right side 340, the rear left side 350, and the rear right side 360 of the vehicle 1.

To this end, the plurality of injection holes 121 may be disposed to inject the deforming material onto the front left side 310, the front right side 320, the left side 330, the right side 340, the rear left side 350, and the rear right side 360 of the vehicle 1.

For example, as shown in FIG. 4, the plurality of injection holes 121 may include one or more among at least one front injection hole 121*a* (121*a*-1 or 121*a*-2) provided at the hood 11*a*, at least one left side injection hole 121*b* (121*b*-1 or 121*b*-2) provided at a left door 14*a* or 14*c*, at least one right side injection hole 121*c* (121*c*-1 or 121*c*-2) provided at a right door 14*b* or 14*d*, at least one rear injection hole 121*d* (121*d*-1 or 121*d*-2) provided at the trunk lid 11*c*, at least one left side mirror injection hole 121*e* provided at the left side mirror 18L, and at least one right side mirror injection hole 121*f* provided at the right side mirror 18R.

However, the positions and the number of the plurality of injection holes 121 may be varied according to embodiments, and any positions and any number of the plurality of injection holes 121 may be employed without limitation as long as they can inject the deforming material onto the front left side 310, the front right side 320, the left side 330, the right side 340, the rear left side 350, and the rear right side 360 of the vehicle 1.

Hereinafter, an embodiment of the vehicle 1 for injecting the deforming material onto the predicted collision position will be described.

Figure 5:
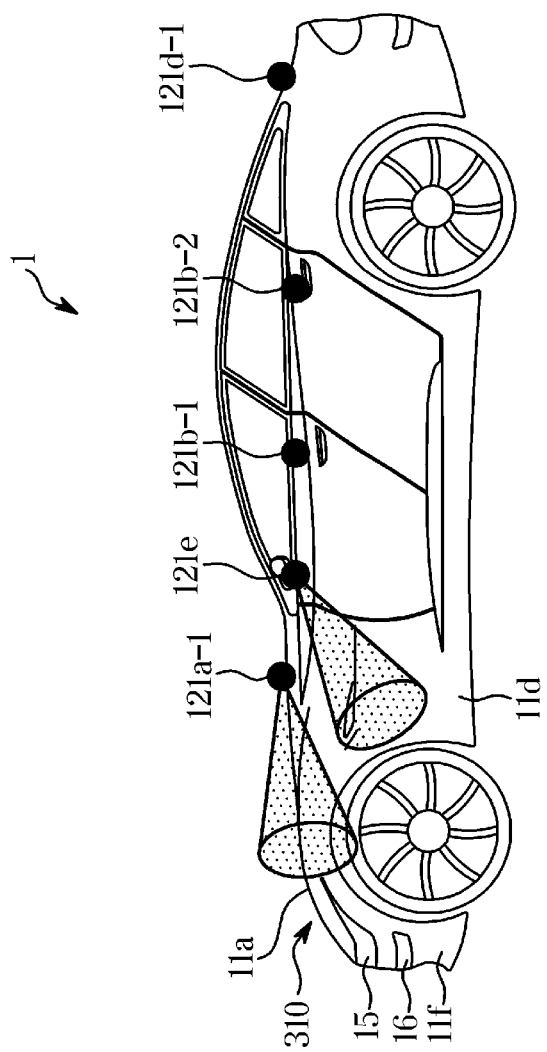
FIG. 5 is a diagram illustrating a state in which a deforming material is injected onto a front left side of the vehicle according to one exemplary embodiment of the present disclosure.
Figure 6:
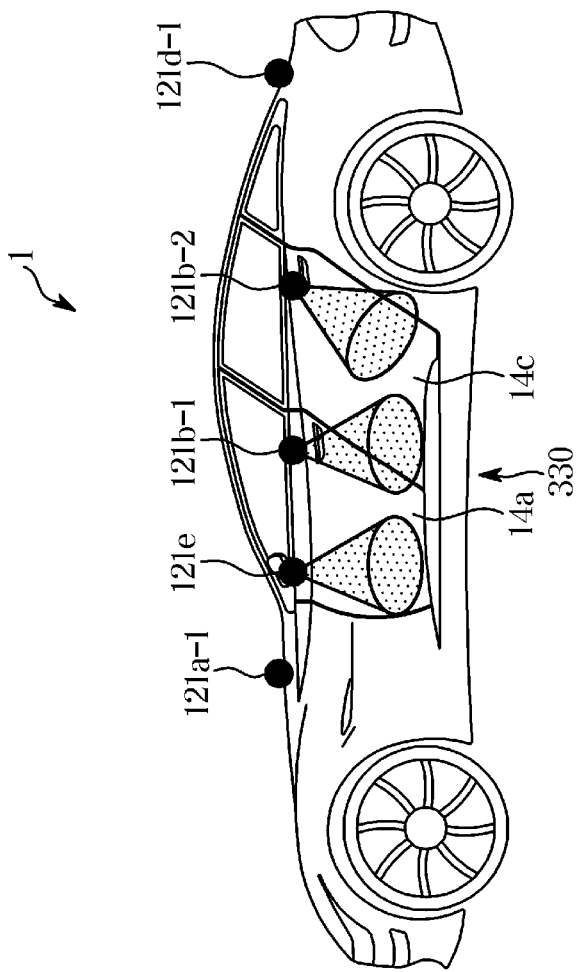
FIG. 6 is a diagram illustrating a state in which the deforming material is injected onto a left side of the vehicle according to one exemplary embodiment of the present disclosure.
Figure 7:
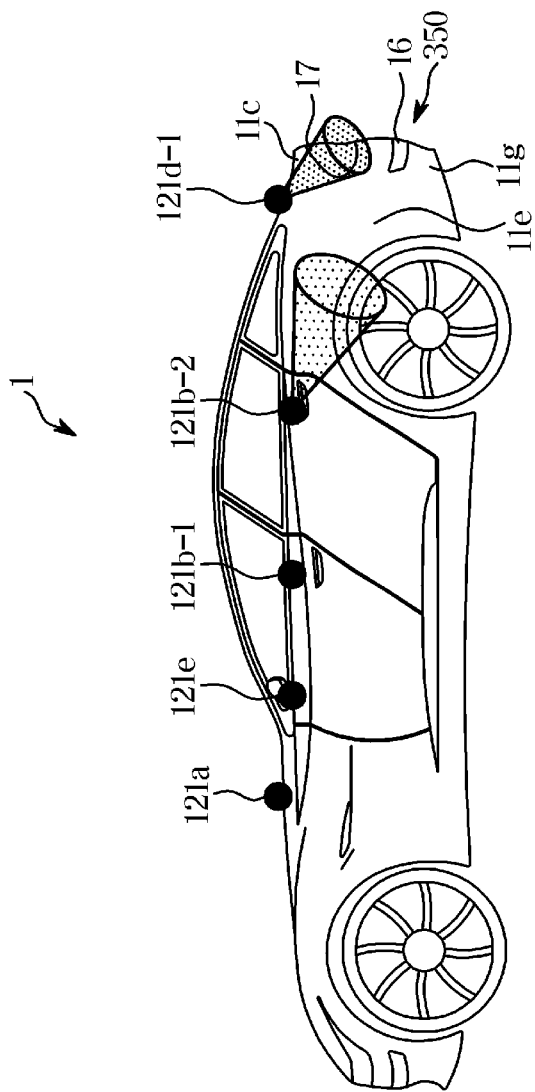
FIG. 7 is a diagram illustrating a state in which the deforming material is injected onto a rear left side of the vehicle according to one exemplary embodiment of the present disclosure.

FIG. 5 is a diagram illustrating a state in which the deforming material is injected onto the front left side 310 of the vehicle 1 according to one embodiment, FIG. 6 is a diagram illustrating a state in which the deforming material is injected onto the left side 330 of the vehicle 1 according to one embodiment, and FIG. 7 is a diagram illustrating a state in which the deforming material is injected onto the rear left side 350 of the vehicle 1 according to one embodiment.

When the collision probability exists, the controller 130 according to one embodiment may determine a predicted collision speed on the basis of the relative position and the relative speed which are measured by the sensor 110.

That is, the controller 130 may determine the predicted collision speed on the basis of a distance between the obstacle and the vehicle 1, which is represented by the measured relative position, and the relative speed between the obstacle and the vehicle 1.

When the predicted collision speed is equal to or greater than a critical collision speed, the controller 130 may control the injector 120 to inject the deforming material.

In this case, the controller 130 may set the critical collision speed on the basis of accident history information stored in the storage 140.

The accident history information corresponds to information received and transmitted through an external server and includes information on previous accident history. Specifically, the information on the previous accident history may include information regarding a relationship between a collision speed and whether a fragment is generated due to a collision.

That is, the controller 130 may set a minimum collision speed, at which a fragment is generated, to the critical collision speed on the basis of the accident history information.

The critical collision speed according to one embodiment may be set differently according to a material of the vehicle body 10 of the vehicle 1, which is positioned at the predicted collision position.

Specifically, when the vehicle body 10 of the vehicle 1 positioned at a predicted collision position is made of a material which easily breaks, which is used in the headlamp 15, the turn signal lamp 16, or the tail lamp 17, the controller 130 may reset the set critical collision speed to be low.

Accordingly, when a material which is likely to generate a fragment even at a low critical collision speed is located at the predicted collision position, the controller 130 may reset the critical collision speed to be lower than the set critical collision speed to prevent generation of a fragment.

Accordingly, the controller 130 may control the injector 120 to inject the deforming material only when the fragment is to be determined as being generated. In other words, in the case of a minor fender-bender, the controller 130 may prevent the injector 120 from injecting the deforming material, thereby preventing an unnecessary injection of the deforming material.

Further, the controller 130 according to one embodiment may determine an injection amount of the deforming material on the basis of the predicted collision speed.

Specifically, when the predicted collision speed is equal to or greater than the critical collision speed, the controller 130 may increase the injection amount of the deforming material in proportion to the predicted collision speed. For example, the controller 130 may determine an injection amount of the deforming material at the critical collision speed as a reference injection amount and may determine the injection amount of the deforming material to increase relative to the reference injection amount in proportion to a difference between the critical collision speed and the predicted collision speed.

The injection amount increasing in proportion to the reference injection amount and the difference between the critical collision speed and the predicted collision speed may be determined in the design stage of the vehicle 1 to be stored in the storage 140 or may be received from the external server through the communication device 150 in a predetermined information form.

Consequently, the vehicle 1 may adaptively adjust the injection amount of the deforming material on the basis of the predicted collision speed and may more effectively absorb an impact caused by a collision and prevent generation of a fragment.

The controller 130 according to one embodiment may determine an injection direction of the injector 120 on the basis of the predicted collision position. That is, the controller 130 may determine to direct an injection direction of the injector 120 to a predicted collision position, at which a collision is predicted to occur, so as to inject the deforming material.

In other words, the controller 130 may determine an angle of the injector 120 to direct an injection direction of the injector 120 to the predicted collision position.

The controller 130 according to one embodiment may control the injector 120 to inject the deforming material in the determined injection direction.

Specifically, the controller 130 may determine an injection hole 121 corresponding to the determined injection direction and control the injector 120 to inject the deforming material through the determined injection hole 121. Here, the controller 130 may control the determined injection hole 121 to be rotated toward the injection direction.

The injection hole 121 corresponding to the determined injection direction may correspond to an injection hole 121 adjacent to the determined injection direction. For example, when the front left side 310 of the vehicle 1 is the determined injection direction, the injection hole 121 corresponding to the determined injection direction may be the left side mirror injection hole 121e and a first front injection hole 121a-1 of the front injection hole 121a, which is located at the left side of the vehicle 1.

Referring to FIG. 5, when an obstacle is located at the front left side 310 of the vehicle 1, the sensor 110 of the vehicle 1 may detect the obstacle located at the front left side 310 of the vehicle 1 and may measure a relative position and a relative speed of the detected obstacle.

The controller 130 may determine a collision probability between the vehicle 1 and the detected obstacle in consideration of at least one among the relative position of the detected obstacle to the vehicle 1, the relative speed thereof to the vehicle 1, deceleration of the vehicle 1, and a steering angle and a steering angular velocity of the vehicle 1, and when the collision probability exists, the controller 130 may determine the front left side 310 of the vehicle 1 as being a predicted collision position.

The controller 130 may determine an injection direction of the injector 120 to be directed to the front left side 310 of the vehicle 1.

Specifically, the controller 130 may determine an injection hole 121 corresponding to the determined injection direction. The injection hole 121 corresponding to the determined injection direction may correspond to an injection hole 121 adjacent to the determined injection direction.

For example, the injection hole 121 corresponding to the front left side 310 of the vehicle 1, which is determined as being the injection direction, may be the left side mirror injection hole 121e and the first front injection hole 121a-1 of the front injection hole 121a, which is located at the left side of the vehicle 1.

In this case, the controller 130 may control the first front injection hole 121a-1 and the left side mirror injection hole 121e to be rotated toward the determined injection direction.

Consequently, the first front injection hole 121a-1 and the left side mirror injection hole 121e may inject the deforming material toward the front left side 310 of the vehicle 1.

The front left side 310 of the vehicle 1 may be applied with the deforming material injected from the first front injection hole 121a-1 and the left side mirror injection hole 121e such that an impact applied to the front left side 310 of the vehicle 1 may be alleviated and coupling strength of the hood 11a, the front fender 11d, the front bumper 11f, the headlamp 15, and the turn signal lamp 16, which are provided at the front left side 310 of the vehicle 1, may be enhanced to prevent generation of a fragment caused by a collision.

That is, since the deforming material has adhesiveness, when the front left side 310 of the vehicle 1 is applied with the deforming material, it is possible to prevent the generation of the fragment when the hood 11a, the front fender 11d, the front bumper 11f, the headlamp 15, and the turn signal lamp 16, which are provided at the front left side 310 of the vehicle 1, are broken due to the collision.

Although the case in which the obstacle is located only at the front left side 310 of the vehicle 1 has been illustrated in FIG. 5, as described above, even in a case in which an obstacle is located at the front right side 320 of the vehicle 1, the controller 130 may determine the injection direction of the injector 120 to be directed to the front right side 320 of the vehicle 1.

Specifically, the controller 130 may determine an injection hole 121 corresponding to the determined injection direction. The injection hole 121 corresponding to the determined injection direction may correspond to an injection hole 121 adjacent to the determined injection direction.

For example, the controller 130 may determine the right side mirror injection hole 121$f$ and the second front injection hole 121$a$-2 of the front injection hole 121$a$, which is located at the right side of the vehicle 1, as the injection hole 121 corresponding to the front right side 320 of the vehicle 1.

Further, the controller 130 may control the second front injection hole 121$a$-2 and the right side mirror injection hole 121$f$ to be rotated toward the determined injection direction.

Consequently, the second front injection hole 121$a$-2 and the right side mirror injection hole 121$f$ may inject the deforming material toward the front right side 320 of the vehicle 1.

Referring to FIG. 6, when an obstacle is located at the left side 330 of the vehicle 1, the sensor 110 of the vehicle 1 may detect the obstacle located at the left side 330 of the vehicle 1 and may measure a relative position and a relative speed of the detected obstacle.

The controller 130 may determine a collision probability between the vehicle 1 and the detected obstacle in consideration of at least one among the relative position of the detected obstacle to the vehicle 1, the relative speed thereof to the vehicle 1, deceleration of the vehicle 1, and a steering angle and a steering angular velocity of the vehicle 1, and when the collision probability exists, the controller 130 may determine the left side 330 of the vehicle 1 as being a predicted collision position.

The controller 130 may determine an injection direction of the injector 120 to be directed to the left side 330 of the vehicle 1.

Specifically, the controller 130 may determine an injection hole 121 corresponding to the determined injection direction. The injection hole 121 corresponding to the determined injection direction may correspond to an injection hole 121 adjacent to the determined injection direction.

For example, the injection hole 121 corresponding to the left side 330 of the vehicle 1, which is determined as being the injection direction, may be the left side injection hole 121$b$ and the left side mirror injection hole 121$e$.

In this case, the controller 130 may control the left side injection hole 121$b$ and the left side mirror injection hole 121$e$ to be rotated toward the determined injection direction.

Consequently, the left side injection hole 121$b$ and the left side mirror injection hole 121$e$ may inject the deforming material toward the left side 330 of the vehicle 1.

The left side 330 of the vehicle 1 may be applied with the deforming material injected from the left side injection hole 121$b$ and the left side mirror injection hole 121$e$ such that an impact applied to the left side 330 of the vehicle 1 may be alleviated and coupling strength of the front left door 14$a$ and the rear left door 14$c$, which are provided at the left side 330 of the vehicle 1, may be enhanced to prevent generation of a fragment caused by a collision.

That is, since the deforming material has adhesiveness, when the left side 330 of the vehicle 1 is applied with the deforming material, it is possible to prevent the generation of the fragment as the front left door 14$a$ and the rear left door 14$c$, which are provided at the left side 330 of the vehicle 1, are broken due to the collision.

Although the case in which the obstacle is located at only the left side 330 of the vehicle 1 has been illustrated in FIG. 6, as described above, even in a case in which an obstacle is located at the right side 340 of the vehicle 1, the controller 130 may determine the injection direction of the injector 120 to be directed to the right side 340 of the vehicle 1.

Specifically, the controller 130 may determine an injection hole 121 corresponding to the determined injection direction. The injection hole 121 corresponding to the determined injection direction may correspond to an injection hole 121 adjacent to the determined injection direction.

For example, the controller 130 may determine the right side injection hole 121$c$ and the right side mirror injection hole 121$f$ as the injection hole 121 corresponding to the right side 340 of the vehicle 1.

Further, the controller 130 may control the right side injection hole 121$c$ and the right side mirror injection hole 121$f$ to be rotated toward the determined injection direction.

Consequently, the right side injection hole 121$c$ and the right side mirror injection hole 121$f$ may inject the deforming material toward the right side 340 of the vehicle 1.

Referring to FIG. 7, when an obstacle is located at the rear left side 350 of the vehicle 1, the sensor 110 of the vehicle 1 may detect the obstacle located at the rear left side 350 of the vehicle 1 and may measure a relative position and a relative speed of the detected obstacle.

The controller 130 may determine a collision probability between the vehicle 1 and the detected obstacle in consideration of at least one among the relative position of the detected obstacle to the vehicle 1, the relative speed thereof to the vehicle 1, deceleration of the vehicle 1, and a steering angle and a steering angular velocity of the vehicle 1, and when the collision probability exists, the controller 130 may determine the rear left side 350 of the vehicle 1 as being a predicted collision position.

The controller 130 may determine an injection direction of the injector 120 to be directed to the rear left side 350 of the vehicle 1.

Specifically, the controller 130 may determine an injection hole 121 corresponding to the determined injection direction. The injection hole 121 corresponding to the determined injection direction may correspond to an injection hole 121 adjacent to the determined injection direction.

For example, the injection hole 121 corresponding to the rear left side 350 of the vehicle 1, which is determined as being the injection direction, may be the first rear injection hole 121$d$-1 of the rear injection hole 121$d$, which is located at the left side of the vehicle 1, and the second left side injection hole 121$b$-2 of the left side injection hole 121$b$, which is provided at the rear left door 14$c$.

In this case, the controller 130 may control the first rear injection hole 121$d$-1 and the second left side injection hole 121$b$-2 to be rotated toward the determined injection direction.

Consequently, the first rear injection hole 121$d$-1 and the second left side injection hole 121$b$-2 may inject the deforming material toward the rear left side 350 of the vehicle 1.

The rear left side 350 of the vehicle 1 may be applied with the deforming material injected from the first rear injection hole 121$d$-1 and the second left side injection hole 121$b$-2 such that an impact applied to the rear left side 350 of the vehicle 1 may be alleviated and coupling strength of the trunk lid 11$c$, the quarter panel 11$e$, the rear bumper 11$g$, the turn signal lamp 16, tail lamp 17, which are provided at the rear left side 350 of the vehicle 1, may be enhanced to prevent generation of a fragment caused by a collision.

That is, since the deforming material has adhesiveness, when the rear left side 350 of the vehicle 1 is applied with the deforming material, it is possible to prevent the generation of the fragment as the trunk lid 11$c$, the quarter panel 11*e*, the rear bumper 11*g*, and the turn signal lamp 16, which are provided at the rear left side 350 of the vehicle 1, are broken due to the collision.

Although the case in which the obstacle is located at only the rear left side 350 of the vehicle 1 has been illustrated in FIG. 7, as described above, even in a case in which an obstacle is located at the rear right side 360 of the vehicle 1, the controller 130 may determine the injection direction of the injector 120 to be directed to the rear right side 360 of the vehicle 1.

Specifically, the controller 130 may determine an injection hole 121 corresponding to the determined injection direction. The injection hole 121 corresponding to the determined injection direction may correspond to an injection hole 121 adjacent to the determined injection direction.

For example, the controller 130 may determine the second rear injection hole 121*d*-2 of the rear injection hole 121*d*, which is located at the right side of the vehicle 1, and the second right side injection hole 121*c*-2 of the right side injection hole 121*c*, which is provided at the rear right door 14*d*, as the injection hole 121 corresponding to the rear right side 360 of the vehicle 1.

Further, the controller 130 may control the second rear injection hole 121*d*-2 and the second right side injection hole 121*c*-2 to be rotated toward the determined injection direction.

Consequently, the second rear injection hole 121*d*-2 and the second right rear injection hole 121*c*-2 may inject the deforming material toward the rear right side 360 of the vehicle 1.

Figure 8:
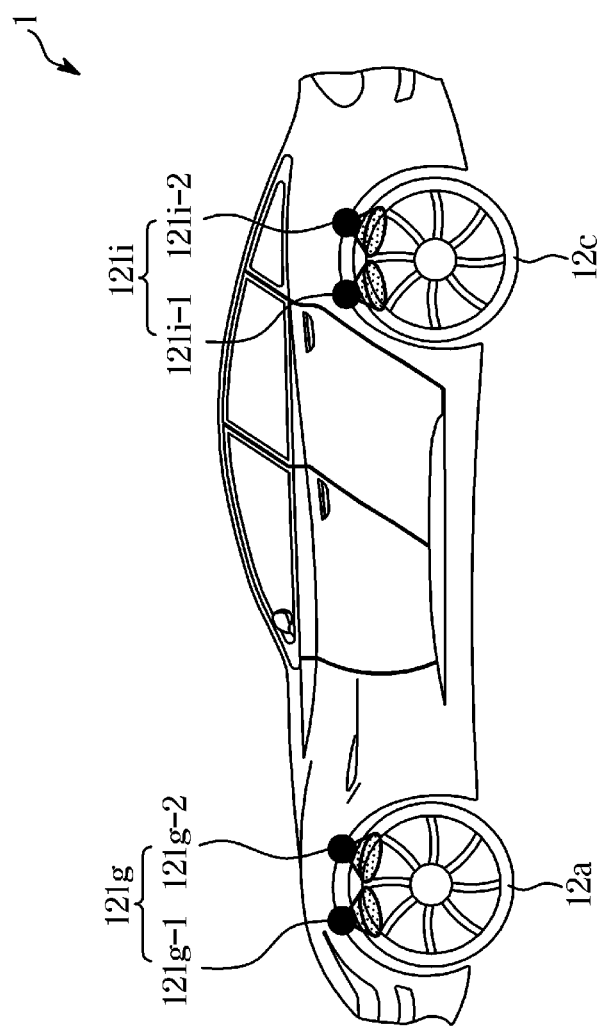
FIG. 8 is a diagram illustrating a state in which the deforming material is injected into a tire of the vehicle according to one exemplary embodiment of the present disclosure.

FIG. 8 is a diagram illustrating a state in which the deforming material is injected into a tire of the vehicle 1 according to one embodiment.

The sensor 110 according to one embodiment may further include an air pressure sensor (not shown) for measuring an air pressure of a tire provided at the wheel 12.

The sensor 110 may measure an air pressure of a tire provided on a front left wheel 12*a*, a front right side wheel (not shown), a rear left wheel 12*c*, and a rear right side wheel (not shown) using the air pressure sensor (nor shown). That is, the air pressure sensor (not shown) may be provided at each of the tires.

The controller 130 according to one embodiment may determine a puncture probability of each of the tires on the basis of the measured air pressure of each thereof.

That is, the controller 130 may determine a puncture probability of each of the tires on the basis of an air pressure of each of a front left wheel 12*a*, a front right wheel (not shown), a rear left wheel 12*c*, and a rear right wheel (not shown).

Specifically, when an air pressure of a corresponding tire measured by the sensor 110 is equal to or less than a critical air pressure, the controller 130 may determine that a puncture probability of the corresponding tire exists.

The critical air pressure may correspond to a minimum air pressure at which a puncture probability exists according to reduction of an air pressure which may appear in the event of a flat tire.

The controller 130 according to one embodiment may control the injector 120 to inject the deforming material in a direction of a tire at which a puncture probability exists.

Specifically, the controller 130 may determine an injection hole 121 corresponding to a tire at which a puncture probability exists. The injection hole 121 corresponding to the tire at which the puncture probability exists may correspond to an injection hole 121 located at a wheel house where the wheel 12 at which the tire having the puncture possibility is provided.

The injector 120 may include at least one injection hole 121 provided at a wheel house located at each of the front left wheel 12*a*, a front right wheel (not shown), the rear left wheel 12*c*, and a rear right wheel (not shown).

As shown in FIG. 8, when a tire having a puncture possibility corresponds to a tire provided at the front left wheel 12*a*, the controller 130 may determine at least one injection hole 121*g* (121*g*-1 or 121*g*-2) provided at a wheel house at which the front left wheel 12*a* is located as the injection hole 121 corresponding to the tire at which the puncture probability exists.

Accordingly, at least one injection hole 121*g* provided at the wheel house at which the front left wheel 12*a* is located may inject the deforming material in a direction of a tire of the front left wheel 12*a* at which the puncture probability exists.

As shown in FIG. 8, when a tire having a puncture possibility corresponds to a tire provided at the rear left wheel 12*c*, the controller 130 may determine at least one injection hole 121*i* (121*i*-1 or 121*i*-2) provided at a wheel house at which the rear left wheel 12*c* is located as the injection hole 121 corresponding to the tire at which the puncture probability exists.

Accordingly, at least one injection hole 121*i* provided at the wheel house at which the rear left wheel 12*c* is located may inject the deforming material in a direction of a tire of the rear left wheel 12*c* at which the puncture probability exists.

Although only the injection of the deforming material according to the puncture possibilities of the tires provided at the front left wheel 12*a* and the rear left wheel 12*c* has been illustrated in FIG. 8, but as with the front left wheel 12*a* and the rear left wheel 12*c* according to embodiments, it is also possible to inject the deforming material in directions of the tires provided at the front right wheel (not shown) and the rear right wheel (not shown) according to the puncture probabilities thereof.

As described above, each of the tires of the vehicle 1 may be applied with the deforming material injected into each of the tires from the injection hole 121 provided at the wheel house according to the puncture possibility of each of the tire, and thus coupling strength of the tire of the vehicle 1 is enhanced such that a fragment caused by the puncture of the tire may not be generated.

That is, since the deforming material has adhesive, when the tires of the vehicle 1 are applied with the deforming material, it is possible to prevent generation of a fragment as the tires of the vehicle 1 are broken due to a puncture.

The controller 130 according to one embodiment may control the output device 160 to visually or audibly output the puncture probability. Specifically, the controller 130 may control the display 161 to visually output the puncture probability and may control the speaker 162 to audibly output the puncture probability.

Consequently, the driver of the vehicle 1 may recognize the puncture possibility of the tire in advance and may induce an exchange of a tire at which the puncture possibility exists and a safety work to be performed.

Hereinafter, a control method of the vehicle 1 according to one embodiment will be described. The vehicle 1 according to the above-described embodiments may be applied to the control method of the vehicle 1 which will be described below. Therefore, the contents described above with reference to FIGS. 1 to 8 are identically applicable to the control method of the vehicle 1 according to one embodiment without any particular description.

Figure 9:
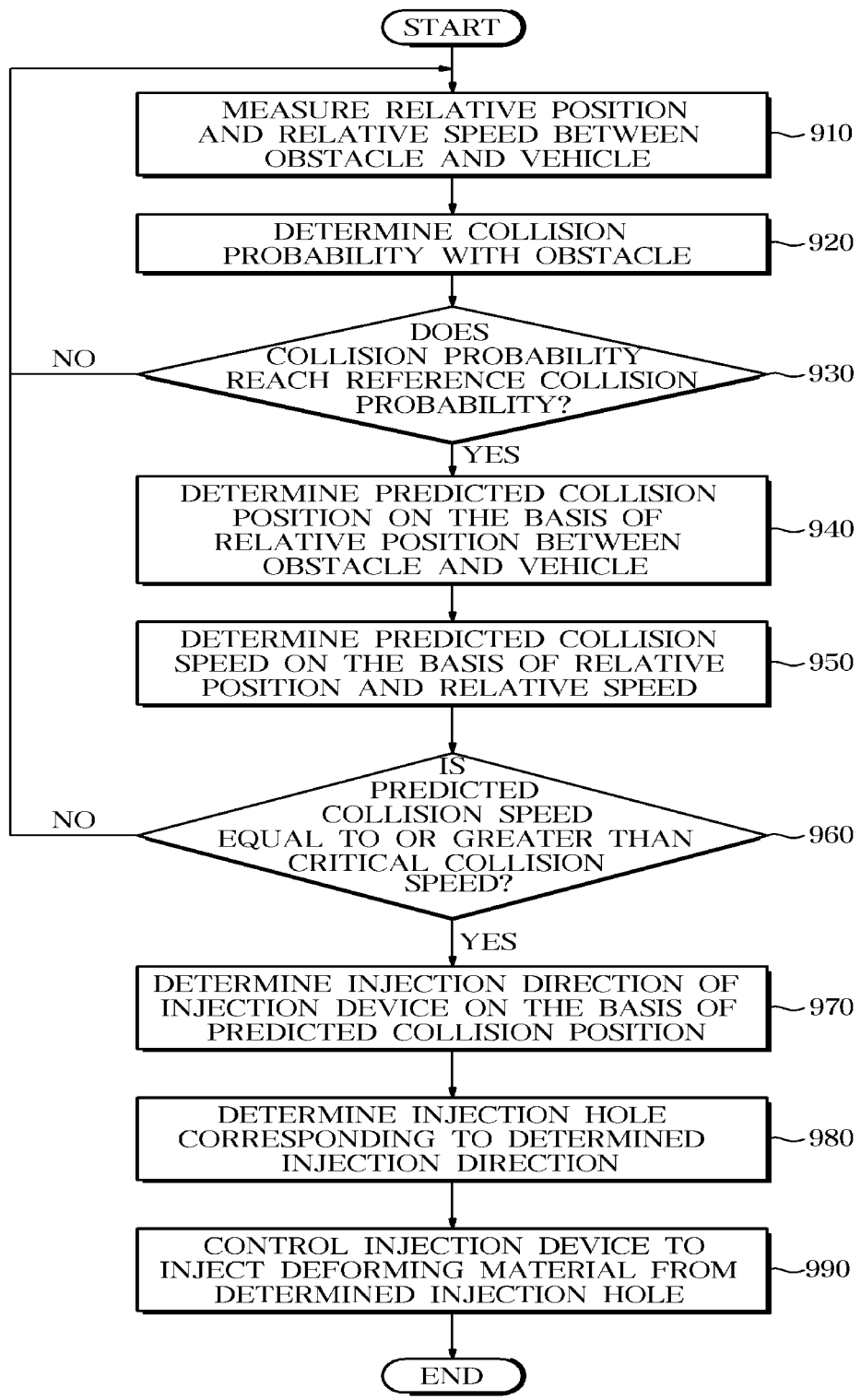
FIG. 9 is a flowchart illustrating a control method of a vehicle according to one exemplary embodiment of the present disclosure, in which the deforming material is injected to a predicted collision position on the basis of a collision probability.

FIG. 9 is a flowchart illustrating a control method of the vehicle 1 according to one embodiment, in which the deforming material is injected to a predicted collision position on the basis of a collision probability.

Referring to FIG. 9, the sensor 110 of the vehicle 1 according to one embodiment may measure a relative position and a relative speed between an obstacle and the vehicle 1 (910).

Specifically, the proximity sensor 111 of the sensor 110 may be provided at the front, the rear, and the lateral side of the vehicle 1 to detect an obstacle, and thus the proximity sensor 111 may determine in which direction the detected obstacle is located relative to the vehicle 1. Consequently, the sensor 110 may measure the relative position between the detected obstacle and the vehicle 1.

Further, the proximity sensor 111 of the sensor 110 may irradiate electromagnetic waves, receive the electromagnetic waves reflected from an object, and measure a relative speed between the detected obstacle and the vehicle 1 on the basis of a distance variation between the continuously measured detected obstacle and the vehicle 1.

The controller 130 according to one embodiment may determine a collision probability with the obstacle (920).

Specifically, the controller 130 may calculate a TTC on the basis of the relative position and the relative speed between the obstacle and the vehicle 1, which are measured by the sensor 110, and when the calculated TTC is equal to or less than a predetermined critical time, the controller 130 may determine that a collision probability exists.

The predetermined critical time may be a maximum time at which the collision probability between the obstacle and the vehicle 1 exists and may be set at a design stage of the vehicle 1.

That is, when the TTC is equal to or less than the predetermined critical time, even though a driver of the vehicle 1 performs braking or rotates a steering wheel, the collision probability may exist.

The controller 130 according to one embodiment may determine a collision probability with the obstacle on the basis of the acceleration and the deceleration which are measured by the acceleration sensor 112 of the sensor 110.

Specifically, when the measured deceleration is equal to or greater than predetermined critical deceleration, the controller 130 may determine that rapid braking for avoiding a collision is performed and may determine a collision probability on the basis of the determination result.

For example, when a distance between an obstacle and the vehicle 1, which is indicated by the relative position between the obstacle and the vehicle 1 measured by the sensor 110, is equal to or less than a critical distance, and the deceleration measured by the sensor 110 is equal to or greater than the critical deceleration, the controller 130 may determine that the rapid braking for avoiding a collision is performed and the collision probability exists.

The critical distance may correspond to a distance in which a collision probability between the vehicle 1 and the obstacle exists according to whether the vehicle 1 is braked and may be set at the design stage of the vehicle 1.

Further, the critical deceleration may correspond to reference deceleration for determining whether rapid braking is performed and may be set on the basis of driving pattern information which represents a driving pattern of the driver.

The controller 130 according to one embodiment may determine a collision probability with the obstacle on the basis of the steering angle and the steering angular velocity which are measured by the steering sensor 113 of the sensor 110.

Specifically, when the measured steering angle and the measured steering angular velocity are respectively equal to or greater than a critical steering angle and a critical steering angular velocity, the controller 130 may determine that rapid turning for avoiding a collision is performed and may determine a collision probability on the basis of the determination result.

For example, when a distance between an obstacle and the vehicle 1, which is indicated by the relative position between the obstacle and the vehicle 1 measured by the sensor 110, is equal to or less than a critical distance, and the steering angle and the steering angular velocity, which are measured by the sensor 110, are respectively equal to or greater than the critical steering angle and the critical steering angular velocity, the controller 130 may determine that the rapid turning for avoiding a collision is performed and the collision probability exists.

The critical distance may correspond to a distance in which a collision probability between the vehicle 1 and the obstacle exists according to whether the vehicle 1 turns and may be set at the design stage of the vehicle 1.

Further, the critical steering angle and the critical steering angular velocity may respectively correspond to a reference steering angle and a reference steering angular velocity, which are used to determine whether rapid turning is performed and may be set on the basis of the driving pattern information which represents the driving pattern of the driver.

When the collision probability exists (the example of 930), the controller 130 according to one embodiment may determine a predicted collision position on the basis of the relative position between the obstacle and the vehicle 1 (940).

The predicted collision position may be at least one among the front left side 310, the front right side 320, the left side 330, the right side 340, the rear left side 350, and the rear right side 360 of the vehicle 1.

The controller 130 according to one embodiment may determine a predicted collision speed on the basis of the relative position and the relative speed (950).

That is, the controller 130 may determine the predicted collision speed on the basis of a distance between the obstacle and the vehicle 1, which is represented by the measured relative position, and the relative speed between the obstacle and the vehicle 1.

In this case, the controller 130 may set the critical collision speed on the basis of accident history information stored in the storage 140.

The accident history information corresponds to information received and transmitted through an external server and includes information on previous accident history. Specifically, the information on the previous accident history may include information regarding a relationship between a collision speed and whether a fragment is generated due to a collision.

That is, the controller 130 may set a minimum collision speed, at which a fragment is generated, to the critical collision speed on the basis of the accident history information.

The critical collision speed according to one embodiment may be set differently according to a material of the vehicle body 10 of the vehicle 1, which is positioned at the predicted collision position.

Specifically, when the vehicle body 10 of the vehicle 1 positioned at a predicted collision position is made of a material which easily breaks, which is used in the headlamp 15, the turn signal lamp 16, or the tail lamp 17, the controller 130 may reset the set critical collision speed to be low.

Accordingly, when a material which is likely to generate a fragment even at a low critical collision speed is located at the predicted collision position, the controller 130 may reset the critical collision speed to be lower than the set critical collision speed to prevent generation of a fragment.

Accordingly, the controller 130 may control the injector 120 to inject the deforming material only when the fragment is to be determined as being generated. In other words, in the case of a minor fender-bender, the controller 130 may prevent the injector 120 from injecting the deforming material, thereby preventing an unnecessary injection of the deforming material.

Further, the controller 130 according to one embodiment may determine an injection amount of the deforming material on the basis of the predicted collision speed.

Specifically, when the predicted collision speed is equal to or greater than the critical collision speed, the controller 130 may increase the injection amount of the deforming material in proportion to the predicted collision speed. For example, the controller 130 may determine an injection amount of the deforming material at the critical collision speed as a reference injection amount and may determine the injection amount of the deforming material to increase relative to the reference injection amount in proportion to a difference between the critical collision speed and the predicted collision speed.

The injection amount increasing in proportion to the reference injection amount and the difference between the critical collision speed and the predicted collision speed may be determined in the design stage of the vehicle 1 to be stored in the storage 140 or may be received from the external server through the communication device 150 in a predetermined information form.

Consequently, the vehicle 1 may adaptively adjust the injection amount of the deforming material on the basis of the predicted collision speed and may more effectively absorb an impact caused by a collision and prevent generation of a fragment.

When the predicted collision speed is equal to or greater than the critical collision speed (YES in 960), the controller 130 according to one embodiment may determine an injection direction of the injector 120 on the basis of the predicted collision position (970).

That is, the controller 130 may determine to direct an injection direction of the injector 120 to a predicted collision position, at which a collision is predicted to occur, so as to inject the deforming material.

In other words, the controller 130 may determine an angle of the injector 120 to direct an injection direction of the injector 120 to the predicted collision position.

The controller 130 according to one embodiment may determine an injection hole 121 corresponding to the determined injection direction (980).

The injection hole 121 corresponding to the determined injection direction may correspond to an injection hole 121 adjacent to the determined injection direction. For example, when the front left side 310 of the vehicle 1 is the determined injection direction, the injection hole 121 corresponding to the determined injection direction may be the left side mirror injection hole 121e and a first front injection hole 121a-1 of the front injection hole 121a, which is located at the left side of the vehicle 1.

Further, the controller 130 according to one embodiment may control the determined injection hole 121 to inject the deforming material (990). In this case, the controller 130 may control the determined injection hole 121 to be rotated toward the injection direction.

The predicted collision position of the vehicle 1 may be applied with the deforming material. Consequently, even though an obstacle collides with the vehicle 1 at the predicted collision position, an impact caused by the collision may be alleviated, and generation of a fragment caused by the collision may be prevented to prevent a second accident due to the fragment.

Figure 10:
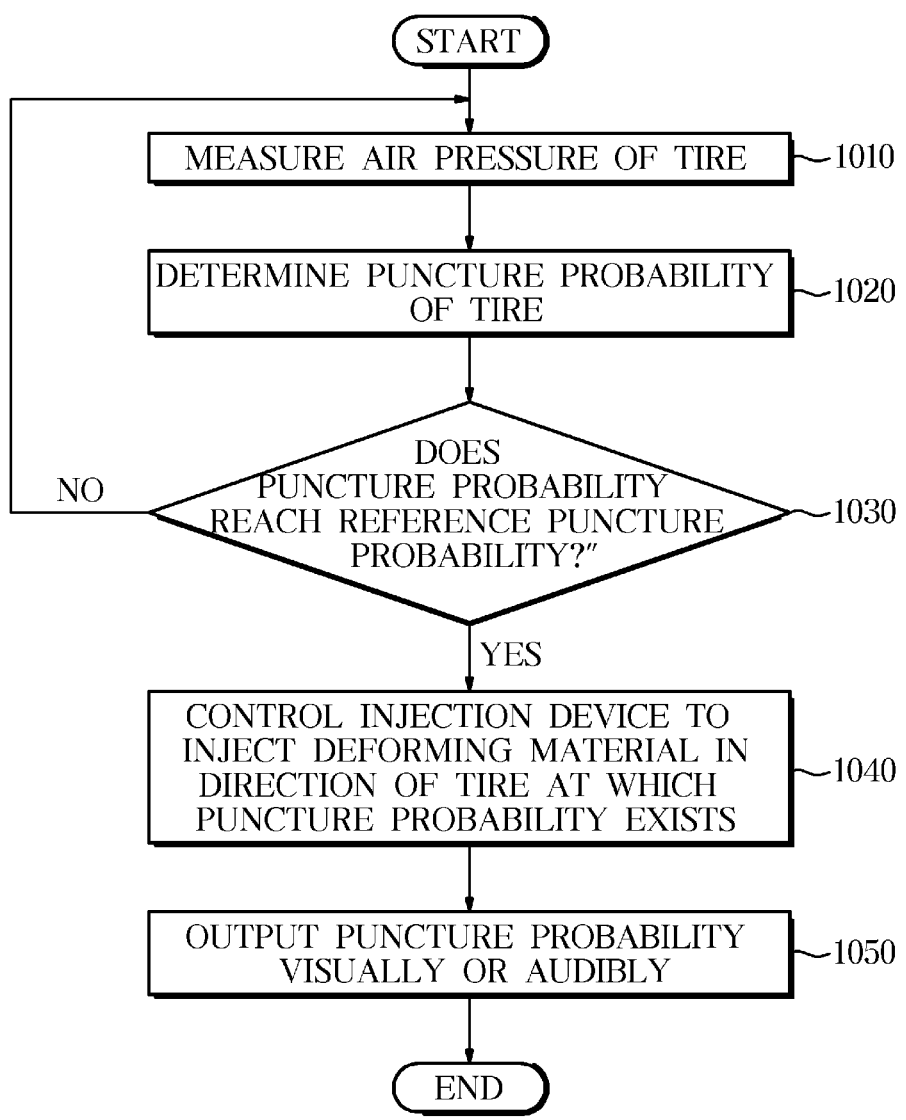
FIG. 10 is a flowchart illustrating the control method of a vehicle according to one exemplary embodiment of the present disclosure, in which the deforming material is injected into a tire on the basis of a puncture possibility.

FIG. 10 is a flowchart illustrating the control method of the vehicle 1 according to one embodiment, in which the deforming material is injected into a tire on the basis of a puncture possibility.

Referring to FIG. 10, the sensor 110 according to one embodiment may measure an air pressure of a tire (1010).

The sensor 110 may measure an air pressure of a tire provided at a front left wheel 12a, a front right side wheel (not shown), a rear left wheel 12c, and a rear right side wheel (not shown) using the air pressure sensor (nor shown). That is, the air pressure sensor (not shown) may be provided at each of the tires.

The controller 130 according to one embodiment may determine a puncture probability of a tire (1020).

That is, the controller 130 may determine a puncture probability of each of the tires on the basis of an air pressure of each of a front left wheel 12a, a front right wheel (not shown), a rear left wheel 12c, and a rear right wheel (not shown).

Specifically, when an air pressure of a corresponding tire measured by the sensor 110 is equal to or less than a critical air pressure, the controller 130 may determine that a puncture probability of the corresponding tire exists.

The critical air pressure may correspond to a minimum air pressure at which a puncture probability exists according to reduction of an air pressure which may appear in the event of a flat tire.

When the puncture probability exists (YES in 1030), the controller 130 according to one embodiment may control the injector 120 to inject the deforming material in a direction of a tire at which the puncture probability exists (1040).

Specifically, the controller 130 may determine an injection hole 121 corresponding to a tire at which a puncture probability exists. The injection hole 121 corresponding to the tire at which the puncture probability exists may correspond to an injection hole 121 located at a wheel house where the wheel 12 at which the tire having the puncture possibility is provided.

The injector 120 may include at least one injection hole 121 provided at a wheel house located at each of the front left wheel 12a, a front right wheel (not shown), the rear left wheel 12c, and a rear right wheel (not shown).

When a tire having a puncture possibility corresponds to a tire provided at the front left wheel 12a, the controller 130 may determine at least one injection hole 121g (121g-1 and 121g-2) provided at a wheel house at which the front left wheel 12a is located as the injection hole 121 corresponding to the tire at which the puncture probability exists.

Accordingly, at least one injection hole 121g provided at the wheel house at which the front left wheel 12a is located may inject the deforming material in a direction of the tire of the front left wheel 12a at which the puncture probability exists.

As shown in FIG. 8, when a tire having a puncture possibility corresponds to a tire provided at the rear left wheel 12c, the controller 130 may determine at least one injection hole 121i (121i-1 or 121i-2) provided at a wheel house at which the rear left wheel 12c is located as the injection hole 121 corresponding to the tire at which the puncture probability exists.

Accordingly, at least one injection hole 121i provided at the wheel house at which the rear left wheel 12c is located may inject the deforming material in a direction of the tire of the rear left wheel 12c at which the puncture probability exists.

Like the front left wheel 12a and the rear left wheel 12c according to embodiments, it is also possible to inject the deforming material in directions of the tires provided at the front right wheel (not shown) and the rear right wheel (not shown) according to the puncture probabilities thereof.

As described above, each of the tires of the vehicle 1 may be applied with the deforming material injected into each of the tires from the injection hole 121 provided at the wheel house according to the puncture possibility of each of the tire, and thus coupling strength of the tire of the vehicle 1 is enhanced such that a fragment caused by the puncture of the tire may not be generated.

That is, since the deforming material has adhesive, when the tires of the vehicle 1 are applied with the deforming material, it is possible to prevent generation of a fragment as the tires of the vehicle 1 are broken due to a puncture.

The output device 160 according to one embodiment may visually or audibly output the puncture possibility (1050).

Specifically, the controller 130 according to one embodiment may control the output device 160 to visually or audibly output a punctuality (1050). Specifically, the controller 130 may control the display 161 to visually output the puncture probability and may control the speaker 162 to audibly output the puncture probability.

Consequently, the driver of the vehicle 1 may recognize the puncture possibility of the tire in advance and may induce an exchange of a tire at which the puncture possibility exists and a safety work to be performed.

The disclosed embodiments may be implemented in the form of a recording medium storing commands executable by a computer. The commands may be stored in the form of program codes and, when executed by a processor, may generate a program module to perform the operations of the disclosed embodiments. The recording medium may be implemented as a computer-readable recording medium.

The computer-readable recording medium includes all kinds of recording media storing instructions which are decipherable by a computer. For example, there may be a read only memory (ROM), a random access memory (RAM), a magnetic tape, a magnetic disk, a flash memory, an optical data storage device, and the like.

As is apparent from the above description, a collision is predicted and a material for absorbing an impact at a position at which a collision is predicted and enhancing coupling strength at portion to which the material is attached is injected at a position at which a collision is predicted such that it is possible to prevent generation of a fragment due to a collision accident and prevent a secondary accident due to the fragment.

Hereinbefore, the disclosed embodiments have been described with reference to the accompanying drawings. It would be appreciated by those skilled in the art to which the present disclosure pertains that other forms different from the disclosed embodiments can be implemented without departing from the technical spirit and essential features of the present disclosure. The disclosed embodiments are illustrative and should not be construed as limitative.

What is claimed is:

1. A vehicle comprising:
a sensor configured to measure a relative position and a relative speed between an obstacle and the vehicle;
an injector configured to inject a deforming material, which is solidified during injection to absorb an impact and to enhance coupling strength at a portion to which the deforming material is attached; and
a controller configured to determine a collision probability with the obstacle based on the measured relative position and the measured relative speed, to determine a predicted collision position when the collision probability reaches a reference collision probability, to determine an injection direction of the injector based on the predicted collision position, and to control the injector to inject the deforming material in the determined injection direction.

2. The vehicle of claim 1, wherein the controller calculates a time to collision (TTC) between the obstacle and the vehicle based on the measured relative position and the measured relative speed, and
when the calculated TTC is equal to or less than a critical time, the controller determines the collision probability reaches the reference collision probability.

3. The vehicle of claim 1, wherein the sensor detects deceleration of the vehicle, and
wherein, when a distance between the obstacle and the vehicle is equal to or less than a critical distance and the deceleration is equal to or greater than a critical deceleration, the controller determines that the collision probability reaches the reference collision probability.

4. The vehicle of claim 1, wherein:
the sensor detects at least one of a steering angle and a steering angular velocity of the vehicle; and
when a distance between the obstacle and the vehicle is equal to or less than a critical distance and the steering angle is equal to or greater than a critical steering angle or the steering angular velocity is equal to or greater than a critical steering angular velocity, the controller determines that the collision probability reaches the reference collision probability.

5. The vehicle of claim 1, wherein, when the collision probability reaches the reference collision probability, the controller determines a predicted collision speed based on the measured relative position and the measured relative speed, and
when the predicted collision speed is equal to or greater than a critical collision speed, the controller controls the injector to inject the deforming material in the determined injection direction.

6. The vehicle of claim 5, wherein the controller determines an injection amount of the deforming material based on the predicted collision speed.

7. The vehicle of claim 1, wherein the predicted collision position is at least one among a front left side, a front right side, a left side, a right side, a rear left side, or a rear right side of the vehicle.

8. The vehicle of claim 7, wherein the controller determines an angle of the injector to direct the injector to the determined injection direction.

9. The vehicle of claim 1, wherein the injector includes at least one of a front injection hole at a hood, a left injection hole at a left door, a right injection hole at a right door, a rear injection hole at a trunk lid, a left side mirror injection hole at a left side mirror, or a right side mirror injection hole at a right side mirror.

10. The vehicle of claim 9, wherein the controller determines an injection hole corresponding to the determined injection direction and controls the injector to inject the deforming material in the determined injection hole.

11. The vehicle of claim 10, wherein the controller controls the determined injection hole to be directed to the determined injection direction.

12. The vehicle of claim 1, further comprising an output device configured to visually or audibly output the collision probability and the injection direction.

13. A control method of a vehicle, comprising steps of:
measuring, by a sensor, a relative position and a relative speed between an obstacle and the vehicle;
determining, by a controller, a collision probability with the obstacle based on the measured relative position and the measured relative speed;
when the collision probability reaches a reference collision probability, determining, by the controller, a predicted collision position;
determining, by the controller, an injection direction of an injector for injecting a deforming material based on the predicted collision position, the deforming material is solidified during injection to absorb an impact and to enhance coupling strength at a portion onto which the deforming material is injected; and
controlling, by the controller, the injector to inject the deforming material in the determined injection direction.

14. The control method of claim 13, wherein the step of determining the collision probability includes steps of:
calculating a time to collision (TTC) between the obstacle and the vehicle based on the measured relative position and the measured relative speed; and
when the calculated TTC is equal to or less than a critical time, determining that the collision probability reaches the reference collision probability.

15. The control method of claim 13, wherein the step of determining the collision probability includes steps of:
detecting deceleration of the vehicle; and
when a distance between the obstacle and the vehicle is equal to or less than a critical distance and the deceleration is equal to or greater than a critical deceleration, determining that the collision probability reaches the reference collision probability.

16. The control method of claim 13, wherein the step of determining the collision probability includes steps of:
detecting at least one of a steering angle and a steering angular velocity of the vehicle; and
when a distance between the obstacle and the vehicle, which is represented by the measured relative position, is equal to or less than a critical distance and the steering angle is equal to or greater than a critical steering angle or the steering angular velocity is equal to or greater than a critical steering angular velocity, determining that the collision probability reaches the reference collision probability.

17. The control method of claim 13, wherein the step of controlling the injector includes:
when the collision probability reaches the reference collision probability, determining a predicted collision speed based on the measured relative position and the measured relative speed; and
when the predicted collision speed is equal to or greater than a critical collision speed, controlling the injector to inject the deforming material in the determined injection direction.

18. The control method of claim 17, further comprising determining, by the controller, an injection amount of the deforming material based on the predicted collision speed.

19. The control method of claim 13, wherein the predicted collision position is at least one of a front left side, a front right side, a left side, a right side, a rear left side, or a rear right side of the vehicle.

20. The control method of claim 19, further comprising determining, by the controller, an angle of the injector to be directed to the determined injection direction.

21. The control method of claim 13, wherein the injector includes at least one of a front injection hole at a hood, a left injection hole at a left door, a right injection hole at a right door, a rear injection hole at a trunk lid, a left side mirror injection hole at a left side mirror, or a right side mirror injection hole at a right side mirror.

22. The control method of claim 21, wherein the controlling of the injector includes steps of:
determining an injection hole corresponding to the determined injection direction; and
controlling the injector to inject the deforming material in the determined injection hole.

23. The control method of claim 22, wherein the step of controlling the injector includes controlling the determined injection hole to be directed to the determined injection direction.

* * * * *